US012578051B2

(12) United States Patent　　(10) Patent No.: US 12,578,051 B2

Grant et al.　　(45) Date of Patent: Mar. 17, 2026

(54) FINE FIBER INSULATION PRODUCTS WITH IMPROVED THERMAL PROPERTIES

(71) Applicant: Owens Corning Intellectual Capital, LLC, Toledo, OH (US)

(72) Inventors: Larry Grant, Westerville, OH (US); Dan Gurr, Newark, OH (US); Teno Boone, Columbus, OH (US); Chung-Ying Tsai, Granville, OH (US); Liang Chen, New Albany, OH (US); Gert Mueller, New Albany, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 776 days.

(21) Appl. No.: 17/831,647

(22) Filed: Jun. 3, 2022

(65) Prior Publication Data

US 2022/0390059 A1　　Dec. 8, 2022

Related U.S. Application Data

(60) Provisional application No. 63/196,890, filed on Jun. 4, 2021.

(51) Int. Cl.
　*F16L 59/04*　　(2006.01)
　*F16L 59/02*　　(2006.01)
(52) U.S. Cl.
　CPC .............. *F16L 59/04* (2013.01); *F16L 59/026* (2013.01); *F16L 59/028* (2013.01)
(58) Field of Classification Search
　CPC .. C03C 25/1095; D04H 1/4218; D04H 1/587; D04H 13/006; E04B 1/78; E04F 13/0875; E04F 2290/023; F16L 59/04; F16L 59/026; F16L 59/028
　See application file for complete search history.

(56) References Cited

U.S. PATENT DOCUMENTS

| | | |
|---|---|---|
| 2,128,549 A | 8/1938 | Zier |
| 2,756,158 A | 7/1956 | Hahn et al. |
| 2,946,371 A | 7/1960 | Stephens et al. |
| 3,055,831 A | 9/1962 | Barnett et al. |
| 3,199,714 A | 8/1965 | Bodendorf et al. |
| 3,920,868 A | 11/1975 | Hammer et al. |
| 4,114,335 A | 9/1978 | Carroll |
| 4,337,666 A | 7/1982 | Bhattacharyya et al. |
| 4,357,379 A | 11/1982 | Sloan et al. |
| 4,613,627 A | 9/1986 | Sherman et al. |
| 4,632,685 A | 12/1986 | Debouzie et al. |
| 4,674,674 A | 6/1987 | Patterson et al. |
| 4,759,974 A | 7/1988 | Barthe et al. |
| 4,777,763 A | 10/1988 | Shannon et al. |
| 4,794,728 A | 1/1989 | Tsukada et al. |
| 4,866,905 A | 9/1989 | Bihy et al. |
| 4,923,547 A | 5/1990 | Yamaji et al. |
| 5,244,695 A | 9/1993 | Davidowich et al. |
| 5,298,694 A | 3/1994 | Thompson et al. |
| 5,300,192 A | 4/1994 | Hansen et al. |
| 5,318,990 A | 6/1994 | Strauss |
| 5,342,680 A | 8/1994 | Randall |
| 5,349,041 A | 9/1994 | Blum et al. |
| 5,503,920 A | 4/1996 | Alkire et al. |
| 5,508,079 A | 4/1996 | Grant et al. |
| 5,600,919 A | 2/1997 | Kummermehr et al. |
| 5,609,934 A | 3/1997 | Fay |
| 5,644,880 A | 7/1997 | Lehnert et al. |
| 5,660,900 A | 8/1997 | Andersen et al. |
| 5,661,213 A | 8/1997 | Arkens et al. |
| 5,679,145 A | 10/1997 | Andersen et al. |
| 5,698,298 A | 12/1997 | Jackson et al. |
| 5,743,985 A | 4/1998 | Ernest et al. |
| 5,755,900 A | 5/1998 | Weir et al. |
| 5,763,524 A | 6/1998 | Arkens et al. |
| 5,810,961 A | 9/1998 | Andersen et al. |
| 5,948,833 A | 9/1999 | Jilek et al. |
| 5,977,232 A | 11/1999 | Arkens et al. |
| 6,030,673 A | 2/2000 | Andersen et al. |
| 6,042,911 A | 3/2000 | Berdan, II |
| 6,068,907 A | 5/2000 | Beauregard |
| 6,071,994 A | 6/2000 | Hummerich et al. |

(Continued)

FOREIGN PATENT DOCUMENTS

| | | |
|---|---|---|
| CA | 1228557 A | 10/1987 |
| CA | 2301248 A1 | 9/2000 |

(Continued)

OTHER PUBLICATIONS

"R-Value and Densities Chart" (PLTW Engineering) 2010 [retrieved on Jan. 28, 2021] Retrieved from the internet <URL: https://www.windsor-csd.org/Downloads/R-ValueDensitiesChart2.pdf>.

(Continued)

*Primary Examiner* — Anthony J Green

(74) *Attorney, Agent, or Firm* — Calfee, Halter & Griswold LLP

(57)　　ABSTRACT

An insulation product is disclosed comprising a plurality of glass fibers; and a cross-linked formaldehyde-free binder composition at least partially coating the glass fibers. The glass fibers have an average fiber diameter in the range of 8 HT (2.03 μm) to 15 HT (3.81 μm). At a density (x) between 0.3 pcf and 1.6 pcf, the insulation product may achieve a thermal conductivity (y) less than or equal to that which satisfies Formula (III):

$$y=0.116x^2-0.3002x+0.4219.\qquad\text{Formula (III):}$$

15 Claims, 16 Drawing Sheets

(56)                References Cited

U.S. PATENT DOCUMENTS

| | | | |
|---|---|---|---|
| 6,079,153 | A | 6/2000 | Templeton |
| 6,099,773 | A | 8/2000 | Reck et al. |
| 6,119,424 | A | 9/2000 | Martin et al. |
| 6,120,873 | A | 9/2000 | Grant et al. |
| 6,123,172 | A | 9/2000 | Byrd et al. |
| 6,128,884 | A | 10/2000 | Berdan, II et al. |
| 6,136,916 | A | 10/2000 | Arkens et al. |
| 6,146,746 | A | 11/2000 | Reck et al. |
| 6,150,002 | A | 11/2000 | Varona |
| 6,191,057 | B1 | 2/2001 | Patel et al. |
| 6,221,973 | B1 | 4/2001 | Arkens et al. |
| 6,227,009 | B1 | 5/2001 | Cusick et al. |
| 6,274,661 | B1 | 8/2001 | Chen et al. |
| 6,299,936 | B1 | 10/2001 | Reck et al. |
| 6,305,495 | B1 | 10/2001 | Keegan |
| 6,331,350 | B1 | 12/2001 | Taylor et al. |
| 6,379,770 | B2 | 4/2002 | Vair et al. |
| 6,399,694 | B1 | 6/2002 | McGrath et al. |
| 6,443,256 | B1 | 9/2002 | Baig |
| 6,511,561 | B1 | 1/2003 | Kohlhammer et al. |
| 6,551,951 | B1 | 4/2003 | Fay et al. |
| 6,557,313 | B1 | 5/2003 | Alderman |
| 6,699,945 | B1 | 3/2004 | Chen et al. |
| 6,734,237 | B1 | 5/2004 | Taylor et al. |
| 6,759,116 | B2 | 7/2004 | Edlund |
| 6,774,071 | B2 | 8/2004 | Horner et al. |
| 6,780,356 | B1 | 8/2004 | Putt et al. |
| 6,803,439 | B2 | 10/2004 | Taylor |
| 6,818,694 | B2 | 11/2004 | Hindi et al. |
| 6,838,163 | B2 | 1/2005 | Smith et al. |
| 6,849,683 | B2 | 2/2005 | Husemoen et al. |
| 6,884,838 | B2 | 4/2005 | Taylor et al. |
| 6,884,849 | B2 | 4/2005 | Chen et al. |
| 6,893,711 | B2 | 5/2005 | Williamson et al. |
| 6,933,349 | B2 | 8/2005 | Chen et al. |
| 6,939,818 | B2 | 9/2005 | Drax et al. |
| 6,951,602 | B1 | 10/2005 | Reuter et al. |
| 7,026,390 | B2 | 4/2006 | O'Brien-Bernini et al. |
| 7,067,579 | B2 | 6/2006 | Taylor et al. |
| 7,141,284 | B2 | 11/2006 | Newton et al. |
| 7,141,626 | B2 | 11/2006 | Rodrigues et al. |
| 7,157,524 | B2 | 1/2007 | Chen et al. |
| 7,199,179 | B2 | 4/2007 | Clamen et al. |
| 7,241,487 | B2 | 7/2007 | Taylor et al. |
| 7,300,892 | B2 | 11/2007 | Porter |
| 7,314,557 | B2 | 1/2008 | Beaufils et al. |
| 7,338,702 | B2 | 3/2008 | Swales et al. |
| 7,351,673 | B1 | 4/2008 | Groh et al. |
| 7,377,084 | B2 | 5/2008 | Swiszcz et al. |
| 7,427,575 | B2 | 9/2008 | Shaffer |
| 7,458,235 | B2 | 12/2008 | Beaufils et al. |
| 7,459,490 | B2 | 12/2008 | Husemoen et al. |
| 7,476,427 | B2 | 1/2009 | Ruid et al. |
| 7,547,375 | B2 | 6/2009 | Jaffee et al. |
| 7,585,454 | B2 | 9/2009 | Noga et al. |
| 7,641,764 | B2 | 1/2010 | Yoshida et al. |
| 7,687,416 | B2 | 3/2010 | Choi |
| 7,743,644 | B2 | 6/2010 | O'Leary |
| 7,803,727 | B2 | 9/2010 | Aseere et al. |
| 7,807,592 | B2 | 10/2010 | Bland et al. |
| 7,824,762 | B2 | 11/2010 | Ziegler |
| 7,829,488 | B2 | 11/2010 | Bennett |
| 7,833,638 | B2 | 11/2010 | Zheng et al. |
| 7,842,382 | B2 | 11/2010 | Helbing |
| 7,893,154 | B2 | 2/2011 | Van Herwijnen et al. |
| 7,989,370 | B2 | 8/2011 | Currier et al. |
| 7,993,724 | B2 | 8/2011 | Chacko et al. |
| 8,007,886 | B2 | 8/2011 | Tierney et al. |
| 8,017,531 | B2 | 9/2011 | Ahluwalia et al. |
| 8,044,168 | B2 | 10/2011 | Gudik-Sorensen |
| 8,069,629 | B2 | 12/2011 | Rockwell et al. |
| 8,084,379 | B2 | 12/2011 | Hogan et al. |
| 8,114,210 | B2 | 2/2012 | Hampson et al. |
| 8,118,973 | B2 | 2/2012 | Granger |
| 8,127,509 | B2 | 3/2012 | Propst |
| 8,133,952 | B2 | 3/2012 | Pisanova et al. |
| 8,148,277 | B2 | 4/2012 | Shooshtari et al. |
| 8,161,703 | B2 | 4/2012 | Peeters |
| 8,163,664 | B2 | 4/2012 | Weller, Jr. |
| 8,178,600 | B2 | 5/2012 | Kelly |
| 8,197,587 | B2 | 6/2012 | Jaffrennou et al. |
| 8,209,904 | B2 | 7/2012 | Bouwens et al. |
| 8,209,930 | B2 | 7/2012 | Babbitt et al. |
| 8,211,974 | B2 | 7/2012 | Shooshtari et al. |
| 8,232,334 | B2 | 7/2012 | Kelly et al. |
| 8,246,785 | B2 | 8/2012 | Granger |
| 8,283,266 | B2 | 10/2012 | Jaffee et al. |
| 8,299,153 | B2 | 10/2012 | Kelly |
| 8,329,798 | B2 | 12/2012 | Clamen et al. |
| 8,329,817 | B2 | 12/2012 | Espiard et al. |
| 8,357,746 | B2 | 1/2013 | Shooshtari |
| 8,424,262 | B2 | 4/2013 | Deblander et al. |
| 8,486,516 | B2 | 7/2013 | Hauber et al. |
| 8,552,140 | B2 | 10/2013 | Swift |
| 8,603,631 | B2 | 12/2013 | Helbing |
| 8,604,122 | B2 | 12/2013 | Kelly |
| 8,607,929 | B2 | 12/2013 | Bliton et al. |
| 8,623,234 | B2 | 1/2014 | Jaffrennou et al. |
| 8,650,913 | B2 | 2/2014 | Chacko et al. |
| 8,652,579 | B2 | 2/2014 | Shooshtari et al. |
| 8,791,198 | B2 | 7/2014 | Miller et al. |
| 8,808,443 | B2 | 8/2014 | Jaffrennou |
| 8,815,382 | B2 | 8/2014 | Robinson, Jr. |
| 8,864,893 | B2 | 10/2014 | Hawkins et al. |
| 8,865,816 | B2 | 10/2014 | Zhang |
| 8,887,533 | B2 | 11/2014 | Johnson et al. |
| 8,921,244 | B2 | 12/2014 | Cabell et al. |
| 8,951,341 | B2 | 2/2015 | Jaffrennou et al. |
| 8,959,956 | B2 | 2/2015 | Mirth et al. |
| 8,974,686 | B2 | 3/2015 | Jaffrennou et al. |
| 8,980,774 | B2 | 3/2015 | Zhang et al. |
| 9,039,827 | B2 | 5/2015 | Hampson |
| 9,051,494 | B2 | 6/2015 | Jaffrennou et al. |
| 9,133,571 | B2 | 9/2015 | Chacko et al. |
| 9,133,952 | B2 | 9/2015 | Lamb et al. |
| 9,172,074 | B2 | 10/2015 | Weber et al. |
| 9,174,868 | B2 | 11/2015 | Jaffrennou et al. |
| 9,217,065 | B2 | 12/2015 | Shoemake et al. |
| 9,238,749 | B2 | 1/2016 | Michl et al. |
| 9,242,899 | B2 | 1/2016 | Castro-Cabado et al. |
| 9,290,640 | B2 | 3/2016 | Hawkins et al. |
| 9,306,146 | B2 | 4/2016 | Thuss |
| 9,309,436 | B2 | 4/2016 | Swift |
| 9,359,518 | B2 | 6/2016 | Kalbe et al. |
| 9,359,720 | B2 | 6/2016 | Chuda et al. |
| 9,376,810 | B2 | 6/2016 | Kemp et al. |
| 9,382,404 | B2 | 7/2016 | Zhang |
| 9,404,012 | B2 | 8/2016 | Connaughton et al. |
| 9,453,140 | B2 | 9/2016 | Varagnat et al. |
| 9,453,294 | B2 | 9/2016 | Johnson et al. |
| 9,486,980 | B2 | 11/2016 | Hauber et al. |
| 9,505,883 | B2 | 11/2016 | Appley et al. |
| PP27,475 | P2 | 12/2016 | Kubby |
| 9,528,261 | B2 | 12/2016 | Sandoe et al. |
| 9,546,263 | B2 | 1/2017 | Hawkins et al. |
| 9,550,894 | B2 | 1/2017 | Zhang et al. |
| 9,609,813 | B2 | 4/2017 | Naerum et al. |
| 9,683,085 | B2 | 6/2017 | Zhang et al. |
| 9,683,143 | B2 | 6/2017 | Negri et al. |
| 9,715,872 | B2 | 7/2017 | Guzman et al. |
| 9,718,729 | B2 | 8/2017 | Hernandez-Torres et al. |
| 9,777,472 | B2 | 10/2017 | Wiker et al. |
| 9,815,928 | B2 | 11/2017 | Williamson et al. |
| 9,822,042 | B2 | 11/2017 | Rosenthal et al. |
| 9,840,061 | B2 | 12/2017 | Jaffee |
| 9,869,089 | B2 | 1/2018 | Thomas et al. |
| 9,896,807 | B2 | 2/2018 | Englert et al. |
| 9,909,310 | B2 | 3/2018 | Frank et al. |
| 9,922,634 | B2 | 3/2018 | Thompson, Jr. et al. |
| 9,926,464 | B2 | 3/2018 | Swift et al. |
| 9,938,712 | B2 | 4/2018 | Potter et al. |
| 9,944,452 | B1 | 4/2018 | Mills et al. |
| 9,945,057 | B2 | 4/2018 | Miele et al. |
| 10,000,666 | B2 | 6/2018 | Hawkins et al. |

(56) References Cited

U.S. PATENT DOCUMENTS

| | | | |
|---|---|---|---|
| 10,030,177 | B2 | 7/2018 | Lochel, Jr. et al. |
| 10,047,210 | B2 | 8/2018 | Hernandez-Torres et al. |
| 10,119,211 | B2 | 11/2018 | Obert et al. |
| 10,368,502 | B2 | 8/2019 | Letton et al. |
| 10,815,593 | B2 | 10/2020 | Guo et al. |
| 11,111,372 | B2 | 9/2021 | Zhang et al. |
| 11,136,451 | B2 | 10/2021 | Zhang et al. |
| 11,813,833 | B2 * | 11/2023 | Grant ...................... B32B 5/022 |
| 12,297,342 | B2 * | 5/2025 | Mueller .................... C08K 7/14 |
| 2003/0060113 | A1 | 3/2003 | Christie et al. |
| 2003/0061777 | A1 | 4/2003 | Alderman |
| 2003/0167719 | A1 | 9/2003 | Alderman |
| 2004/0002567 | A1 | 1/2004 | Chen et al. |
| 2004/0038017 | A1 | 2/2004 | Tutin et al. |
| 2004/0180176 | A1 | 9/2004 | Rusek, Jr. |
| 2004/0209074 | A1 | 10/2004 | Randall et al. |
| 2004/0219847 | A1 | 11/2004 | Miller |
| 2004/0254285 | A1 | 12/2004 | Rodrigues et al. |
| 2005/0026527 | A1 | 2/2005 | Schmidt et al. |
| 2005/0032985 | A1 | 2/2005 | Chen et al. |
| 2005/0095937 | A1 | 5/2005 | Chen et al. |
| 2005/0098255 | A1 | 5/2005 | Lembo et al. |
| 2005/0153616 | A1 | 7/2005 | Suda et al. |
| 2005/0166543 | A1 | 8/2005 | Suda et al. |
| 2005/0192390 | A1 | 9/2005 | Dobrowolski et al. |
| 2005/0215153 | A1 | 9/2005 | Cossement et al. |
| 2005/0229518 | A1 | 10/2005 | Ruid et al. |
| 2005/0284065 | A1 | 12/2005 | Shaffer |
| 2005/0288424 | A1 | 12/2005 | Fisler et al. |
| 2006/0036014 | A1 | 2/2006 | Hogan et al. |
| 2006/0078719 | A1 | 4/2006 | Miele |
| 2006/0079629 | A1 | 4/2006 | Taylor et al. |
| 2006/0101796 | A1 | 5/2006 | Kern et al. |
| 2006/0137799 | A1 | 6/2006 | Haque et al. |
| 2006/0168881 | A1 | 8/2006 | Straumietis |
| 2006/0216489 | A1 | 9/2006 | Shooshtari et al. |
| 2006/0217471 | A1 | 9/2006 | Shooshtari et al. |
| 2006/0252855 | A1 | 11/2006 | Pisanova et al. |
| 2006/0257639 | A1 | 11/2006 | Bianchi et al. |
| 2007/0006664 | A1 | 1/2007 | Suda et al. |
| 2007/0010651 | A1 | 1/2007 | Finch et al. |
| 2007/0012414 | A1 | 1/2007 | Kajander et al. |
| 2007/0014995 | A1 | 1/2007 | Chacko et al. |
| 2007/0060005 | A1 | 3/2007 | Yang et al. |
| 2007/0125011 | A1 | 6/2007 | Weir et al. |
| 2007/0270066 | A1 | 11/2007 | Van Herwijnen et al. |
| 2008/0003431 | A1 | 1/2008 | Fellinger et al. |
| 2008/0047548 | A1 | 2/2008 | Konietzny et al. |
| 2008/0138526 | A1 | 6/2008 | Tutin et al. |
| 2008/0152816 | A1 | 6/2008 | Clamen et al. |
| 2008/0176050 | A1 | 7/2008 | Lintz et al. |
| 2008/0248303 | A1 | 10/2008 | Maurer |
| 2009/0004391 | A1 | 1/2009 | Olang et al. |
| 2009/0036011 | A1 | 2/2009 | Hunig et al. |
| 2009/0094923 | A1 | 4/2009 | Weir et al. |
| 2009/0156724 | A1 | 6/2009 | Espiard et al. |
| 2009/0208714 | A1 | 8/2009 | Currier et al. |
| 2009/0324915 | A1 | 12/2009 | Swift et al. |
| 2010/0016143 | A1 | 1/2010 | Shooshtari et al. |
| 2010/0040832 | A1 | 2/2010 | Herbert |
| 2010/0064618 | A1 | 3/2010 | Boyd |
| 2010/0105272 | A1 | 4/2010 | Nandi et al. |
| 2010/0151223 | A1 | 6/2010 | Chacko et al. |
| 2010/0154300 | A1 | 6/2010 | Wiersma |
| 2010/0273006 | A1 | 10/2010 | Rodrigues et al. |
| 2010/0320113 | A1 | 12/2010 | Swift |
| 2011/0003522 | A1 | 1/2011 | Chen et al. |
| 2011/0021101 | A1 | 1/2011 | Hawkins et al. |
| 2011/0028427 | A1 | 2/2011 | Mcmanus |
| 2011/0086226 | A1 | 4/2011 | Evans et al. |
| 2011/0086567 | A1 | 4/2011 | Hawkins et al. |
| 2011/0091710 | A1 | 4/2011 | Mirth et al. |
| 2011/0159768 | A1 | 6/2011 | Crescimanno et al. |
| 2011/0189478 | A1 | 8/2011 | Hirano et al. |
| 2011/0223364 | A1 | 9/2011 | Hawkins et al. |
| 2011/0240910 | A1 | 10/2011 | Carr et al. |
| 2012/0064323 | A1 | 3/2012 | Shoemake et al. |
| 2012/0135659 | A1 | 5/2012 | Preininger |
| 2012/0168054 | A1 | 7/2012 | Chen et al. |
| 2012/0205571 | A1 | 8/2012 | Lewis |
| 2012/0245277 | A1 | 9/2012 | Michl et al. |
| 2012/0251796 | A1 | 10/2012 | Potter et al. |
| 2012/0311744 | A1 | 12/2012 | Sirkowski |
| 2013/0023174 | A1 | 1/2013 | Quinn |
| 2013/0026408 | A1 | 1/2013 | Jaffrennou et al. |
| 2013/0032749 | A1 | 2/2013 | Jaffrennou et al. |
| 2013/0067861 | A1 | 3/2013 | Turner et al. |
| 2013/0082205 | A1 | 4/2013 | Mueller et al. |
| 2013/0084445 | A1 | 4/2013 | Haley et al. |
| 2013/0157030 | A1 | 6/2013 | Frick et al. |
| 2013/0244525 | A1 | 9/2013 | Chacko et al. |
| 2013/0327705 | A1 | 12/2013 | Clark et al. |
| 2013/0334726 | A1 | 12/2013 | Hernandez-Torres et al. |
| 2014/0001395 | A1 | 1/2014 | Chen et al. |
| 2014/0038485 | A1 | 2/2014 | Anderson et al. |
| 2014/0051824 | A1 | 2/2014 | Anderson et al. |
| 2014/0083328 | A1 | 3/2014 | Lochel, Jr. et al. |
| 2014/0099851 | A1 | 4/2014 | Haley et al. |
| 2014/0120348 | A1 | 5/2014 | Didier et al. |
| 2014/0155353 | A1 | 6/2014 | Tezuka et al. |
| 2014/0186635 | A1 | 7/2014 | Mueller |
| 2014/0245797 | A1 | 9/2014 | Haley et al. |
| 2014/0312260 | A2 | 10/2014 | Hampson et al. |
| 2014/0350142 | A1 | 11/2014 | Hansen et al. |
| 2015/0010730 | A1 | 1/2015 | Faynot et al. |
| 2015/0027052 | A1 | 1/2015 | Janssen et al. |
| 2015/0118434 | A1 | 4/2015 | Nagarajan et al. |
| 2015/0152244 | A1 | 6/2015 | Hernandez-Torres |
| 2015/0192239 | A1 | 7/2015 | Lee et al. |
| 2015/0247270 | A1 | 9/2015 | Thaxton et al. |
| 2015/0353765 | A1 | 12/2015 | Swift et al. |
| 2015/0361653 | A1 | 12/2015 | Grant et al. |
| 2015/0373936 | A1 | 12/2015 | Bouwens et al. |
| 2016/0088809 | A1 | 3/2016 | Lowe et al. |
| 2016/0131299 | A1 | 5/2016 | Mueller et al. |
| 2016/0143228 | A1 | 5/2016 | De Groot et al. |
| 2016/0145779 | A1 | 5/2016 | Teng et al. |
| 2016/0208439 | A1 | 7/2016 | Lelogeay |
| 2016/0208483 | A1 | 7/2016 | Takeuchi et al. |
| 2016/0219810 | A1 | 8/2016 | Erkkil et al. |
| 2016/0264461 | A1 | 9/2016 | Peng et al. |
| 2016/0280971 | A1 | 9/2016 | Hampson et al. |
| 2016/0297983 | A1 | 10/2016 | Saha et al. |
| 2016/0340499 | A1 | 11/2016 | Hawkins et al. |
| 2017/0022398 | A1 | 1/2017 | Lochel, Jr. et al. |
| 2017/0036955 | A1 | 2/2017 | Obert et al. |
| 2017/0037187 | A1 | 2/2017 | Appley et al. |
| 2017/0089504 | A1 | 3/2017 | Herreman et al. |
| 2017/0150684 | A1 | 6/2017 | Vuorinen et al. |
| 2017/0150687 | A1 | 6/2017 | Loiske et al. |
| 2017/0174836 | A1 | 6/2017 | Hampson et al. |
| 2017/0190902 | A1 | 7/2017 | Swift |
| 2017/0197379 | A1 | 7/2017 | Teng et al. |
| 2017/0198142 | A1 | 7/2017 | Hampson et al. |
| 2017/0198472 | A1 | 7/2017 | Evans et al. |
| 2017/0210094 | A1 | 7/2017 | Hoshino et al. |
| 2017/0210952 | A1 | 7/2017 | Hampson et al. |
| 2017/0305783 | A1 | 10/2017 | Faynot et al. |
| 2017/0332568 | A1 | 11/2017 | Storey |
| 2017/0349718 | A1 | 12/2017 | Albani et al. |
| 2017/0368792 | A1 | 12/2017 | Faotto |
| 2018/0023291 | A1 | 1/2018 | Wiker et al. |
| 2018/0031268 | A1 | 2/2018 | Lopez Belbeze et al. |
| 2018/0037273 | A1 | 2/2018 | Aarts et al. |
| 2018/0116131 | A1 | 5/2018 | Leo |
| 2018/0139911 | A1 | 5/2018 | Janssen |
| 2018/0194937 | A1 | 7/2018 | Anderson et al. |
| 2018/0208505 | A1 | 7/2018 | Swift et al. |
| 2018/0305589 | A1 | 10/2018 | Lochel, Jr. et al. |
| 2018/0312661 | A1 | 11/2018 | Hernandez-Torres et al. |
| 2018/0339491 | A1 | 11/2018 | Hursit et al. |
| 2019/0062510 | A1 | 2/2019 | Castro Cabado et al. |
| 2019/0106563 | A1 | 4/2019 | Zhang et al. |
| 2019/0106564 | A1 | 4/2019 | Zhang et al. |

(56) References Cited

U.S. PATENT DOCUMENTS

| | | | |
|---|---|---|---|
| 2019/0124864 A1 | 5/2019 | Bassin et al. |
| 2019/0136527 A1 | 5/2019 | Zheng et al. |
| 2019/0151771 A1 | 5/2019 | Thomas |
| 2019/0191641 A1 | 6/2019 | Jackson et al. |
| 2019/0259108 A1 | 8/2019 | Bongartz et al. |
| 2019/0330492 A1 | 10/2019 | Swift et al. |
| 2019/0359521 A1 | 11/2019 | Salomon et al. |
| 2019/0382536 A1 | 12/2019 | Iwang |
| 2019/0382628 A1 | 12/2019 | Alavi et al. |
| 2020/0095712 A1 | 3/2020 | Mueller et al. |
| 2020/0207972 A1 | 7/2020 | Ong et al. |
| 2021/0095156 A1 | 4/2021 | Swift et al. |
| 2021/0140107 A1 | 5/2021 | Mauret et al. |
| 2021/0170715 A1 | 6/2021 | Grant et al. |
| 2021/0171756 A1 | 6/2021 | Grant et al. |
| 2021/0171757 A1 | 6/2021 | Mueller et al. |
| 2021/0172165 A1 | 6/2021 | Grant et al. |
| 2021/0172166 A1 | 6/2021 | Grant et al. |
| 2021/0172167 A1 | 6/2021 | Grant et al. |
| 2021/0395508 A1 | 12/2021 | Zhang et al. |
| 2022/0064408 A1 | 3/2022 | Zhang et al. |
| 2022/0106419 A1 | 4/2022 | Mueller et al. |
| 2022/0106492 A1 | 4/2022 | Click et al. |
| 2022/0162410 A1 | 5/2022 | Mueller et al. |
| 2022/0213628 A1 | 7/2022 | Smith et al. |
| 2022/0389193 A1 | 12/2022 | Grant et al. |
| 2022/0411608 A1 | 12/2022 | Tsai et al. |
| 2024/0228372 A1 | 7/2024 | DeCarolis et al. |
| 2024/0262742 A1 | 8/2024 | Matos et al. |

FOREIGN PATENT DOCUMENTS

| | | | |
|---|---|---|---|
| CA | 2243736 C | 4/2002 |
| CA | 2436506 C | 10/2011 |
| CA | 2834816 A1 | 11/2012 |
| CA | 2604809 C | 4/2013 |
| CN | 1950422 A | 4/2007 |
| EP | 0125397 A1 | 11/1984 |
| EP | 194242 B1 | 10/1989 |
| EP | 442811 B2 | 12/1993 |
| EP | 583086 B1 | 11/1997 |
| EP | 1022400 A1 | 7/2000 |
| EP | 715805 B1 | 7/2002 |
| EP | 1038433 B1 | 6/2008 |
| EP | 2071066 A1 | 6/2009 |
| EP | 2093266 A1 | 8/2009 |
| EP | 2324089 A1 | 5/2011 |
| EP | 2268126 B1 | 4/2012 |
| EP | 1303672 B1 | 2/2015 |
| EP | 2690217 B1 | 3/2015 |
| EP | 2855601 B1 | 9/2016 |
| EP | 2184391 B1 | 10/2016 |
| EP | 3034555 B1 | 4/2017 |
| EP | 2197928 B1 | 5/2017 |
| EP | 2694717 B1 | 6/2017 |
| EP | 2844621 B1 | 6/2017 |
| EP | 1656981 B1 | 1/2018 |
| EP | 1800853 B1 | 2/2018 |
| EP | 2755498 B1 | 2/2018 |
| EP | 2324089 B1 | 3/2018 |
| EP | 2231543 B1 | 9/2018 |
| JP | 2000255270 A | 9/2000 |
| JP | 2017053158 A | 3/2017 |
| JP | 2017106133 A | 6/2017 |
| JP | 2019085672 A | 6/2019 |
| WO | 1992004824 A1 | 4/1992 |
| WO | 1993018642 A1 | 9/1993 |
| WO | 9927206 A1 | 6/1999 |
| WO | 1999061384 A1 | 12/1999 |
| WO | 0123655 A1 | 4/2001 |
| WO | 0131131 A1 | 5/2001 |
| WO | 2004076734 A1 | 9/2004 |
| WO | 2004098270 A1 | 11/2004 |
| WO | 2005077184 A1 | 8/2005 |
| WO | 2006136389 A1 | 12/2006 |
| WO | 2008009460 A1 | 1/2008 |
| WO | 2008009462 A1 | 1/2008 |
| WO | 2008009465 A1 | 1/2008 |
| WO | 2008091256 A1 | 7/2008 |
| WO | 2009080822 A1 | 7/2009 |
| WO | 2011044490 A1 | 4/2011 |
| WO | 2012118939 A1 | 9/2012 |
| WO | 2013021234 A1 | 2/2013 |
| WO | 2015144843 A1 | 10/2015 |
| WO | 2016025987 A2 | 2/2016 |
| WO | 2017074853 A1 | 5/2017 |
| WO | 2017084853 A1 | 5/2017 |
| WO | 2017157525 A1 | 9/2017 |
| WO | 2017211642 A1 | 12/2017 |
| WO | 2018010558 A1 | 1/2018 |
| WO | 2018130648 A1 | 7/2018 |
| WO | 2018158677 A1 | 9/2018 |
| WO | 2019050439 A1 | 3/2019 |
| WO | 2019074865 A1 | 4/2019 |
| WO | 2019074867 A1 | 4/2019 |
| WO | 2019221863 A1 | 11/2019 |
| WO | 2019231994 A1 | 12/2019 |
| WO | 2020144436 A1 | 7/2020 |
| WO | 2020210191 A1 | 10/2020 |
| WO | 2021118951 A1 | 6/2021 |
| WO | 2022051213 A1 | 3/2022 |

OTHER PUBLICATIONS

"Curing (chemistry)" (Wikipedia) [retrieved on Jul. 22, 2022] Retrieved from the internet <URL:https://en.wikipedia.org/wiki/Curing_(chemistry).

International Search Report and Written Opinion from PCT/US22/32061 dated Oct. 5, 2022.

Lee et al., "A Review on Citric Acid as Green Modifying Agent and Binder for Wood," Polymers, 2020; 12(8):1692, 21 pages.

Wikipedia, "Triose," retrieved from <https://en.wikipedia.org/wiki/Triose> on Oct. 29, 2021.

Langlais et al., "Influence of the Chemical Composition of Glass on Heat Transfer through Glass Fibre Inuslations in Relation to Their Morphology and Temperature of Use," J. Thermal Insul. and Bldg. Envs., Volue 18, Apr. 1995, pp. 350-376.

Extended European Search Report from EP Application No. 22816897.7 dated Sep. 26, 2025.

Office Action from JP Application No. 2023-572973 dated Oct. 16, 2025.

* cited by examiner

FINE FIBER INSULATION PRODUCTS WITH IMPROVED THERMAL PROPERTIES

RELATED APPLICATION(S)

This application claims priority to and any benefit of U.S. Provisional Application No. 63/196,890, filed Jun. 4, 2021, the content of which is incorporated herein by reference in its entirety.

FIELD

The present application generally relates to fiberglass insulation products, and more particularly, to fiberglass insulation products with improved performance properties.

BACKGROUND

The term "fibrous insulation product" encompasses a variety of compositions, articles of manufacture, and manufacturing processes. Mineral fibers, such as glass fibers, are commonly used in insulation products and nonwoven mats. Fibrous insulation is typically manufactured by fiberizing a molten composition of polymer, glass, or other mineral fibers from a fiberizing apparatus, such as a rotating spinner. To form an insulation product, fibers produced by the rotating spinner are drawn downwardly from the spinner towards a conveyor by a blower. As the fibers move downward, a binder composition is sprayed onto the fibers and the fibers are collected into a high loft, continuous blanket on the conveyor. The fiber-binder matrix gives the insulation product resiliency for recovery after packaging and provides stiffness and handleability so that the insulation product can be handled and applied as needed in the insulation cavities of buildings. The binder composition also provides protection to the fibers from interfilament abrasion and promotes compatibility between the individual fibers.

The blanket containing the binder-coated fibers is then passed through a curing oven and the binder is cured to set the blanket to a desired thickness. After the binder composition has cured, the fiber insulation may be cut into lengths to form individual insulation products, and the insulation products may be packaged for shipping to customer locations. One typical insulation product produced is an insulation batt or blanket, which is suitable for use as cavity (e.g., wall, floor, ceiling) insulation in residential dwellings or other buildings, and which might also be used to insulate an attic or other portions of a building. Such a batt or blanket is typically a unitary structure that may be relatively flexible or rollable. Another common insulation product is air-blown or loose-fill insulation, which is suitable for use as sidewall and attic insulation in residential and commercial buildings as well as in hard-to-reach locations. Such loose-fill insulation is often formed as many relatively small discrete pieces, tufts, or the like, which may or may not have a binder applied thereto. Loose-fill insulation can also be formed of small cubes that are cut from insulation blankets, compressed, and packaged in bags.

The insulating performance of a thermal insulation material is mainly determined by the ratio of the material's thickness divided by its thermal conductivity (k), which measures the amount of heat (in BTUs per hour) that will be transmitted through one square foot of 1-inch thick insulation in order to cause the temperature to rise or fall one degree from one side of the insulation to the other. The higher the thickness, and the lower the k-value, the better the insulating performance of the material.

Fibrous insulation for building products requires low thermal conductivity to be an effective insulator in wall and ceiling cavities. It is also desirable to reduce overall product weight, although generally, reducing product weight negatively impacts thermal performance. Particularly, attempts have been made to reduce product weight by reducing the diameter of the fibers used to form the fibrous insulation products, which conventionally have an average fiber diameter of about 4 microns (with 1 micron being equal to 3.94 hundred thousandths of an inch or HT) or more.

However, such a reduction of fiber diameter has traditionally been found to negatively impact the insulation value (R-value) of a product at a particular area weight and product thickness. Thus, reducing the average fiber diameter of an insulation product below 4 microns has previously not been practical, as such products were unable to meet performance requirements while still being economical. Accordingly, there is an unmet need for insulation products formed from fibers thinner than 4 microns that effectively meet the necessary performance requirements, such as thermal performance, and may also improve overall material efficiency.

SUMMARY

Various aspects of the present inventive concepts are directed to an insulation product comprising a plurality of glass fibers; and a cross-linked formaldehyde-free binder composition at least partially coating the glass fibers, wherein the insulation product has a length, a width, and a thickness, with the length being greater than each of the width and the thickness. The glass fibers have an average fiber diameter in the range of 8 HT (2.03 μm) to 15 HT (3.81 μm), including the range of 12 HT (3.05 μm) to 14.5 HT (3.68 μm).

In any of the exemplary embodiments disclosed herein, at a density (x) between 0.2 pcf and 1.6 pcf, the insulation product may achieve a thermal conductivity (k-value) (y), expressed as BTU-in/(hr·ft²·° F.), less than or equal to that which satisfies Formula (III):

$$y=0.116x^2-0.3002x+0.4219. \qquad \text{Formula (III)}$$

In some exemplary embodiments the thermal conductivity (k-value) (y) of the insulation product is less than 0.3 BTU-in/(hr·ft²·° F.). In any of the exemplary embodiments disclosed herein, at a density (x) between 0.3 pcf and 1.35 pcf, the insulation product achieves a thermal conductivity (k-value) (y), expressed as BTU-in/(hr·ft²·° F.), within 5% of a value (y) that satisfies Formula (II):

$$y=0.1013x^2-0.2438x+0.3763. \qquad \text{Formula (II)}$$

In any of the exemplary embodiments disclosed herein, the insulation product may have a density (x) in the range of 0.5 pcf to 1.3 pcf, including between 0.7 pcf and 1.0 pcf.

In any of the exemplary embodiments disclosed herein, the insulation product may comprise a length, a width, and a thickness, with the length being greater than each of the width and the thickness, and wherein at least 30% by weight of the glass fibers are oriented within +1-15° of a plane parallel to the length of the insulation product.

In some exemplary embodiments, at least 15% by weight of the glass fibers in the insulation product are at least partially bound in a substantially parallel orientation with at least one other glass fiber in the insulation product.

In any of the exemplary embodiments, prior to crosslinking, the formaldehyde-free binder composition comprises at least one monomeric polyol and polycarboxylic acid in a combined amount of at least 45% by weight, based on a total weight of the binder composition. Additionally, the uncross-linked binder composition may have a pH in the range of 2 to 5.

Further exemplary embodiments are directed to a low-density residential insulation batt comprising a plurality of glass fibers having an average fiber diameter in the range of 8 HT (2.03 μm) and 15 HT (3.81 μm) and a cross-linked formaldehyde-free binder composition at least partially coating the glass fibers, wherein at least 15 wt. % of the glass fibers in the insulation batt are at least partially bound in a substantially parallel orientation with at least one other glass fiber in the insulation batt. The insulation batt, at a density (x) between 0.2 pcf and 1.6 pcf, achieves a thermal conductivity (k-value) (y), expressed as BTU-in/(hr·ft$^2$·° F.), within 5% of a value (y) that satisfies Formula (II):

$$y=0.1013x2-0.2438x+0.3763. \qquad \text{Formula (II)}$$

Moreover, in any of the exemplary embodiments, the insulation batt, at a density (x) between 0.2 pcf and 1.6 pcf, may achieve a thermal conductivity (k-value) (y), expressed as BTU-in/(hr·ft$^2$·° F.), less than or equal to that which satisfies Formula (III):

$$y=0.116x^2-0.3002x+0.4219. \qquad \text{Formula (III)}$$

In these or other exemplary embodiments, the insulation batt has a thermal conductivity (y) no greater than 0.5 BTU-in/(hr·ft$^2$·° F.), or in some embodiments, no greater than 0.3 BTU-in/(hr·ft$^2$·° F.).

In any of the exemplary embodiments, the insulation batt comprises a length, a width, and a thickness, with the length being greater than each of the width and the thickness, and at least 30% by weight of the glass fibers are oriented within +/−15° of a plane parallel to the length of the insulation batt. The glass fibers may be oriented such that no more than 35% by weight of the binder composition is present in the form of a gusset.

Yet further exemplary embodiments are directed to an insulation product comprising a plurality of glass fibers having an average fiber diameter of less than or equal to 15 HT (3.81 μm) and a cross-linked formaldehyde-free binder composition. The insulation product has a length, a width, and a thickness, with the length being greater than each of the width and the thickness. At least 30% by weight of the glass fibers in the insulation product are oriented within +/−15° of a common plane defined by the length and width of the insulation product. The fibrous insulation product, at an R-value in the range of R20 to R24 and a thermal conductivity (k-value) less than 0.35 BTU-in/(hr·ft$^2$·° F.), has a density (x), when uncompressed, that is at least 7% lower than an otherwise comparable insulation product comprising glass fibers having an average fiber diameter of greater than 15 HT (3.81 μm), at a consistent R-value and k-value.

In these or other exemplary embodiments, the insulation product has a density (x) that is between 0.5 pcf and 1.35 pcf and achieves a thermal conductivity (y) less than or equal to that which satisfies Formula (III):

$$y=0.116x^2-0.3002x+0.4219. \qquad \text{Formula(III)}$$

Yet further exemplary embodiments are directed to a method of forming an insulation product. The method comprises fiberizing molten glass into a plurality of glass fibers, coating the glass fibers with an aqueous, formaldehyde-free binder composition, randomly depositing the glass fibers onto a moving conveyor, forming an uncured fiberglass blanket, and passing the uncured fiberglass blanket through a curing oven to cross-link the binder composition and form the insulation product. The insulation product comprises a length, a width, and a thickness, with the length being greater than each of the width and the thickness.

The glass fibers have an average fiber diameter in a range of 8 HT (2.03 μm) to 15 HT (3.81 μm) and the insulation product may have a binder content (LOI) of less than or equal to 8% by weight. In some exemplary embodiments, the insulation product has a density (x) between 0.2 pcf and 1.6 pcf and achieves a thermal conductivity (k-value) (y), expressed as BTU-in/(hr·ft$^2$·° F.), less than that which satisfies Formula (III):

$$y=0.116x^2-0.3002x+0.4219. \qquad \text{Formula (III)}$$

Yet further exemplary embodiments of the present disclosure are directed to an insulation product comprising a plurality of glass fibers having an average fiber diameter of less than or equal to 15 HT (3.81 μm); and a cross-linked formaldehyde-free binder composition at least partially coating the glass fibers. The cross-linked formaldehyde-free binder composition may be formed from an aqueous binder composition comprising at least one monomeric polyol and the insulation product may have a binder content (LOI) of less than or equal to 8% by weight. The insulation product has an R-value in the range of 19 to 24, a thickness between 5.0 inches and 7.0 inches, and a k-value between 0.20 and 0.35 BTU-in/(hr·ft$^2$·° F.). Additionally, the insulation product has a density, when uncompressed, that is at least 30% lower than an otherwise comparable insulation product comprising a binder composition that includes a polymeric polyol.

BRIEF DESCRIPTION OF THE DRAWINGS

Features and advantages of the present invention will become apparent to those of ordinary skill in the art to which the invention pertains from a reading of the following description together with the accompanying drawings, in which:

FIG. 9(*b*) is a graphical representation of the fiber orientation distribution curve (measured in degrees, based on a plane parallel to the product length $L_1$ (0°) taken from the cross-section along the machine direction of the fibrous insulation product of FIG. 9(*a*);

FIG. 10(*b*) is a graphical representation of the fiber orientation distribution curve (measured in degrees, based on a plane parallel to the product length $L_1$ (0°) taken from the cross-section along the machine direction of the fibrous insulation product of FIG. 10(*a*);

DETAILED DESCRIPTION

Figure 1:
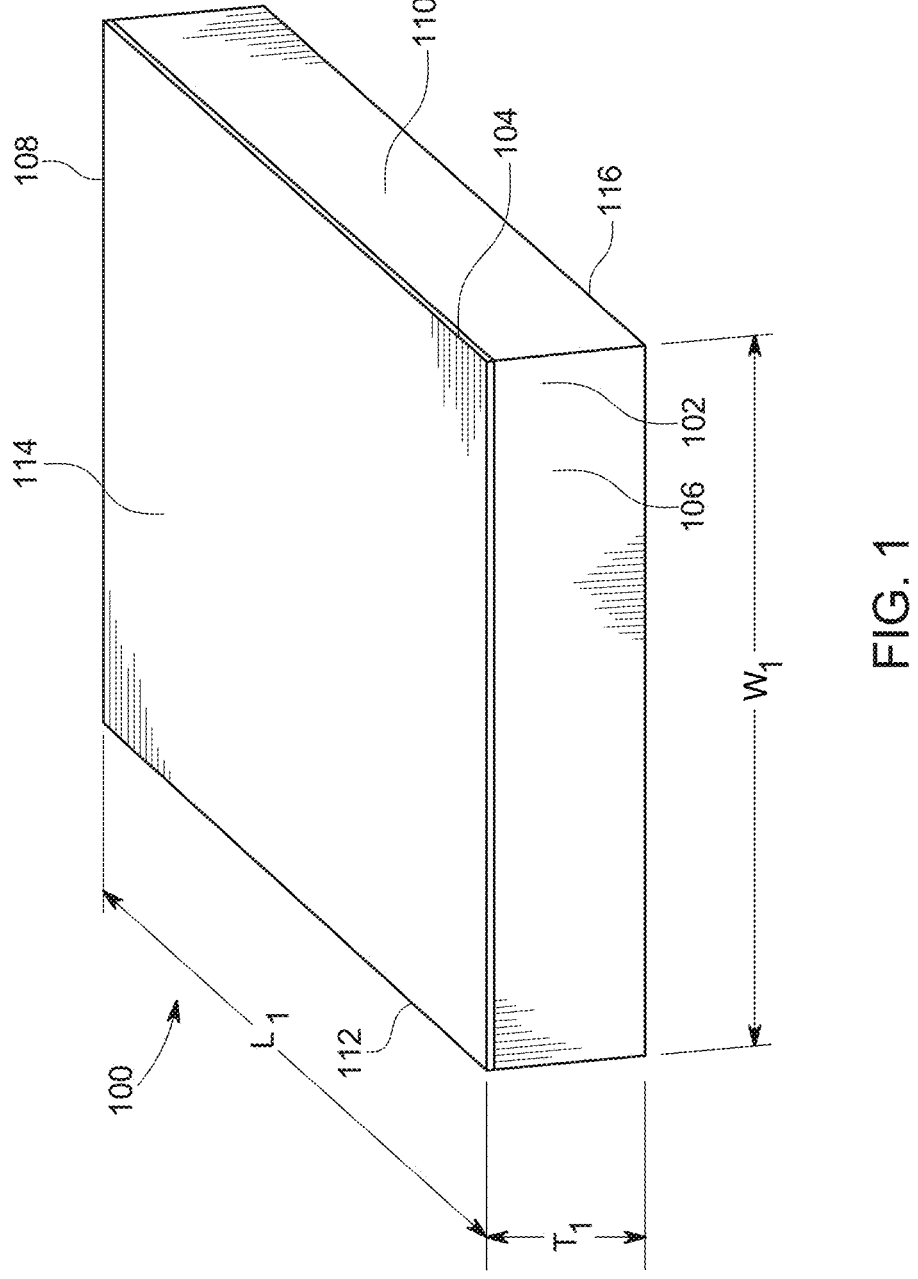
FIG. 1 is a perspective view of an exemplary embodiment of a fibrous insulation product.

Unless otherwise defined, all technical and scientific terms used herein have the same meaning as commonly understood by one of ordinary skill in the art to which these exemplary embodiments belong. The terminology used in the description herein is for describing exemplary embodiments only and is not intended to be limiting of the exemplary embodiments. Accordingly, the general inventive concepts are not intended to be limited to the specific embodiments illustrated herein. Although other methods and materials similar or equivalent to those described herein can be used in the practice or testing of the present invention, the preferred methods and materials are described herein.

As used in the specification and the appended claims, the singular forms "a," "an," and "the" are intended to include the plural forms as well, unless the context clearly indicates otherwise.

Unless otherwise indicated, all numbers expressing quantities of ingredients, chemical and molecular properties, reaction conditions, and so forth, as well as physical and measured attributes, used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least each numerical parameter should be construed in light of the number of significant digits and ordinary rounding approaches.

Unless otherwise indicated, any element, property, feature, or combination of elements, properties, and features, may be used in any embodiment disclosed herein, regardless of whether the element, property, feature, or combination of elements, properties, and features was explicitly disclosed in the embodiment. It will be readily understood that features described in relation to any particular aspect described herein may be applicable to other aspects described herein provided the features are compatible with that aspect. In particular: features described herein in relation to the method may be applicable to the fibrous product and vice versa; features described herein in relation to the method may be applicable to the aqueous binder composition and vice versa; and features described herein in relation to the fibrous product may be applicable to the aqueous binder composition and vice versa.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Every numerical range given throughout this specification and claims will include every narrower numerical range that falls within such broader numerical range, as if such narrower numerical ranges were all expressly written herein.

As used herein, the terms "binder composition," "aqueous binder composition," "binder formulation," "binder," and "binder system" may be used interchangeably and are synonymous. Additionally, as used herein, the terms "formaldehyde-free" or "no added formaldehyde" may be used interchangeably and are synonymous.

All numerical ranges are understood to include all possible incremental sub-ranges within the outer boundaries of the range. Thus, for example, a density range of 0.2 pcf to 2.0 pcf discloses, for example, 0.5 pcf to 1.2 pcf, 0.7 pcf to 1.0 pcf, etc.

By "substantially free" it is meant that a composition includes less than 1.0% by weight of the recited component, including no greater than 0.8% by weight, no greater than 0.6% by weight, no greater than 0.4% by weight, no greater than 0.2% by weight, no greater than 0.1% by weight, no greater than 0.5% by weight, and no greater than 0.01% by weight.

As used herein, the unit "pounds" or "lb" refers to pounds-mass.

The present disclosure relates to fiberglass insulation products formed with fine diameter glass fibers (i.e., fibers having an average fiber diameter less than or equal to 15 HT) to achieve a more favorable fiber orientation and product structure. The fiberglass insulation products demonstrate surprisingly improved thermal performance and overall material efficiency.

The fibrous insulation products of the present disclosure comprise a plurality of fibers, such as organic or inorganic fibers. In certain exemplary embodiments, the plurality of fibers are inorganic fibers, including, but not limited to glass fibers, glass wool fibers, mineral wool fibers, slag wool fibers, stone wool fibers, ceramic fibers, metal fibers, and combinations thereof.

Optionally, the fibers may comprise natural fibers and/or synthetic fibers such as carbon, polyester, polyethylene, polyethylene terephthalate, polypropylene, polyamide, aramid, and/or polyaramid fibers. The term "natural fiber" as used herein refers to plant fibers extracted from any part of a plant, including, but not limited to, the stem, seeds, leaves, roots, or phloem. Examples of natural fibers suitable for use in the insulation products include wood fibers, cellulosic fibers, straw, wood chips, wood strands, cotton, jute, bamboo, ramie, bagasse, hemp, coir, linen, kenaf, sisal, flax, henequen, and combinations thereof. The fibrous insulation products may be formed entirely of one type of fiber, or they may be formed of a combination of types of fibers. For example, the fibrous insulation products may be formed of combinations of various types of glass fibers or various combinations of different inorganic fibers and/or natural fibers depending on the desired application. In any of the embodiments disclosed herein, the insulation products may be formed substantially of or entirely of glass fibers.

The fibrous insulation products utilize glass fibers having a smaller diameter than the glass fibers used in conventional fiberglass insulation products, particularly residential insulation products that typically have an average fiber diameter greater than 4 μm (15.7 HT), such as 16 HT or 18 HT. In particular, the exemplary fibrous insulation products disclosed or suggested herein may include glass fibers having an average fiber diameter, prior to the application of the binder composition, equal to or less than 3.81 μm (15 HT), including average fiber diameters no greater than 3.76 μm (14.8 HT), no greater than 3.68 μm (14.5 HT), no greater than 3.61 μm (14.2 HT), no greater than 3.56 μm (14 HT), no greater than 3.43 μm (13.5 HT), no greater than 3.30 μm (13 HT), no greater than 3.18 μm (12.5 HT), and no greater than 3.05 μm (12 HT). In any of the exemplary embodiments, the fibrous insulation product may include glass fibers having an average fiber diameter in the range of 3.05 μm (12.0 HT) to 3.81 μm (15.0 HT), or in the range of 3.30 μm (13.0 HT) to 3.76 μm (14.8 HT), or in the range of 3.43 μm (13.5 HT) to 3.61 μm (14.2 HT). In other exemplary embodiments, the insulation product may include glass fibers having an average fiber diameter in the range of 2.03 μm (8.0 HT) to 3.05 μm (12.0 HT), or in the range of 2.29 μm (9.0 HT) to 2.79 μm (11.0 HT), or in the range of 2.03 μm (8.0 HT) to 2.54 μm (10.0 HT).

An exemplary procedure used to measure the diameters of the glass fibers utilizes a scanning electron microscope (SEM) to directly measure fiber diameter. In general, a specimen of the fibrous insulation product is heated to remove any organic materials (e.g., binder composition) therefrom, the glass fibers from the specimen are then reduced in length and photographed by the SEM. The diameters of the fibers are then measured from the saved images by image processing software associated with the SEM.

More specifically, a specimen of the fibrous insulation product is heated to 800° F. for a minimum of 30 minutes. The specimen may be heated longer if required to ensure removal of any organic materials. The specimen is then cooled to room temperature and the glass fibers are reduced in length in order to fit onto an SEM planchette. The glass fibers may be reduced in length by any suitable method, such as for example, cut by scissors, chopped by a razor blade, or ground in a mortar and pestle. The glass fibers are then adhered to the surface of the SEM planchette such that the fibers are not overlapping or spaced too far apart.

Once the specimen is prepared for imaging, the specimen is mounted in the SEM using normal operating procedures and photographed by the SEM at appropriate magnification for the diameter size of the fibers being measured. A sufficient number of images are collected and saved to ensure enough fibers are available for measuring. For example, 10 to 13 images may be required where 250 to 300 individual fibers are being measured. The fiber diameters are then measured using an SEM image analysis software program, such as for example, Scandium SIS imaging software. An average fiber diameter of the specimen is then determined from the number of fibers measured. The fibrous insulation product specimen may include glass fibers that are fused together (i.e., two or more fibers joined along their lengths). For the purpose of calculating the average fiber diameter of specimens in the present disclosure, fused fibers are treated as single fibers.

An alternative procedure used to measure the average fiber diameter of the glass fibers utilizes a device that measures air flow resistance to indirectly determine the mean or "effective" fiber diameter of the distributed fibers in a specimen. More specifically, in one embodiment of the alternative procedure, a specimen of the fibrous insulation product is heated to 800-1,000° F. for 30 minutes. The specimen may be heated longer if required to ensure removal of any organic materials from the surface of the fibers. The specimen is then cooled to room temperature and a test specimen weighing about 7.50 grams is loaded into the device's chamber. A constant air flow is applied through the chamber, and once the air flow has stabilized, the differential pressure, or pressure drop, through the specimen is measured by the device. Based on the air flow and differential pressure measurements, the device can compute the average fiber diameter of the specimen.

The fibrous insulation products of the present disclosure comprise a formaldehyde-free or "no added formaldehyde" aqueous binder compositions for use in binding the inorganic fibers in the manufacture of the insulation products. The phrase "binder composition" refers to organic agents or chemicals, often polymeric resins, used to adhere the inorganic fibers to one another in a three-dimensional structure. The binder composition may be in any form, such as a solution, an emulsion, or dispersion. "Binder dispersions" or "binder emulsions" thus refer to mixtures of binder chemicals in a medium or vehicle. As used herein, the terms "binder composition," "aqueous binder composition," "binder formulation," "binder," and "binder system" may be used interchangeably and are synonymous. Additionally, as used herein, the terms "formaldehyde-free" or "no added formaldehyde" may be used interchangeably and refer to a binder composition including less than about 1 ppm formaldehyde when cured or otherwise dried. The 1 ppm is based on the weight of the product being measured for formaldehyde release.

A wide variety of binder compositions may be used with the glass fibers of the present invention. For example, binder compositions fall into two broad, mutually exclusive classes: thermoplastic and thermosetting. Both thermoplastic and thermosetting binder compositions may be used with the invention. A thermoplastic material may be repeatedly heated to a softened or molten state and will return to its former state upon cooling. In other words, heating may cause a reversible change in the physical state of a thermoplastic material (e.g. from solid to liquid) but it does not undergo any irreversible chemical reaction. Exemplary thermoplastic polymers suitable for use in the fibrous insulation product 100 include, but are not limited to, polyvinyls (such as polyvinyl acetate, polyvinyl alcohol, polyvinyl butyral, and the like), polyethylene terephthalate (PET), polypropylene or polyphenylene sulfide (PPS), nylon, polycarbonates, polystyrene, polyamides, polyolefins, acrylic and methacrylic acid ester resins, and certain copolymers of polyacrylates.

In contrast, the term thermosetting polymer refers to a range of systems which exist initially as liquids but which, on heating, undergo a reaction to form a solid, highly crosslinked matrix. Thus, thermosetting compounds comprise reactant systems, often pairs of reactants, that irreversibly crosslink upon heating. When cooled, they do not regain their former liquid state but remain irreversibly crosslinked.

The reactants useful as thermosetting compounds generally have one or more of several reactive functional groups: e.g. amine, amide, carboxyl, or hydroxyl. As used herein, "thermoset compound" (and its derivative clauses like "thermosetting compound," "thermosetting binder" or "thermoset binder") refers to at least one of such reactants, it being understood that two or more may be necessary to form the crosslinking system characteristic of thermosetting compounds. In addition to the principle reactants of the thermosetting compounds, there may be catalysts, process aids, and other additives.

One category of thermosetting binders includes a variety of phenol-aldehyde, urea-aldehyde, melamine-aldehyde, and other condensation-polymerization materials. Phenolic/formaldehyde binder compositions are a known thermosetting binder system and have historically been favored for their low cost and the ability to go from a low viscosity liquid in the uncured state to a rigid thermoset polymer when cured.

Formaldehyde-free, thermosetting binder systems may include those based on polycarboxy polymers and a polyol. An example is the polyacrylic acid/polyol/polyacid binder system described in U.S. Pat. Nos. 6,884,849 and 6,699,945 to Chen et al., the entire contents of which are each expressly incorporated herein by reference. Another example is the polymeric polycarboxylic acid/long chain polyol/short chain polyol binder system described in U.S. Patent Publ. No. 2019/0106564 to Zhang, et al., the disclosure of which being fully incorporated herein by reference. Another example is the polymeric polycarboxylic acid/monomeric polyol binder system described in U.S. Provisional Patent Application No. 63/086,267, the disclosure of which being fully incorporated herein by reference. Yet another example is the polycarboxylic acid/polyol/nitrogen-based protective agent binder system described in U.S. Provisional Patent Application No. 63/073,013, the disclosure of which being fully incorporated herein by reference.

A second category of formaldehyde-free, thermosetting binder compositions are referred to as "bio-based" or "natural" binders. "Bio-based binder" and "natural binder" are used interchangeably herein to refer to binder compositions made from nutrient compounds, such as carbohydrates, proteins, or fats, which have much reactive functionality. Because they are made from nutrient compounds, they are environmentally friendly. Bio-based binder compositions are described in more detail in U.S. Pat. Publication No. 2011/0086567 to Hawkins et al., filed Oct. 8, 2010, the entire contents of which are expressly incorporated herein by reference.

In some exemplary embodiments, the binder includes Owens-Corning's EcoTouch™ binder or EcoPure™ binder, Owens Corning's Sustaina™ binder, or Knauf's ECOSE® binder.

Alternative reactants useful as thermosetting compounds are triammonium citrate-dextrose systems derived from mixing dextrose monohydrate, anhydrous citric acid, water and aqueous ammonia. Additionally, carbohydrate reactants and polyamine reactants are useful thermosetting compounds, wherein such thermosetting compounds are described in more detail in U.S. Pat. Nos. 8,114,210, 9,505, 883 and 9,926,464, the disclosures of which are hereby incorporated by reference.

It has surprisingly been discovered that fibrous insulation products manufactured using glass fibers having an average fiber diameter below 15 HT have improved properties when manufactured using a formaldehyde-free binder composition comprising a polyol and a primary cross-linking agent, such as a polycarboxylic acid or salt thereof. Particularly notable improvements have been discovered when the polyol included in the binder composition is a monomeric polyol.

The primary crosslinking agent may be any compound suitable for crosslinking a polyol. Non-limiting examples of suitable cross-linking agents include polycarboxylic acid-based materials having one or more carboxylic acid groups (—COOH), such as monomeric and polymeric polycarboxylic acids, including salts or anhydrides thereof, and mixtures thereof. In any of the exemplary embodiments, the polycarboxylic acid may be a polymeric polycarboxylic acid, such as a homopolymer or copolymer of acrylic acid. The polymeric polycarboxylic acid may comprise polyacrylic acid (including salts or anhydrides thereof) and polyacrylic acid-based resins such as QR-1629S and Acumer 9932, both commercially available from The Dow Chemical Company, polyacrylic acid compositions commercially from CH Polymer, and polyacrylic acid compositions commercially available from Coatex. Acumer 9932 is a polyacrylic acid/sodium hypophosphite resin having a molecular weight of about 4,000 and a sodium hypophosphite content of 6-7% by weight, based on the total weight of the polyacrylic acid/sodium hypophosphite resin. QR-1629S is a polyacrylic acid/glycerin resin composition. Aquaset-529 is a composition containing polyacrylic acid crosslinked with glycerol.

The polycarboxylic acid may comprise a polymeric polycarboxylic acid, such as polyacrylic acid, poly(meth)acrylic acid, polymaleic acid, and like polymeric polycarboxylic acids, anhydrides, salts, or mixtures thereof, as well as copolymers of acrylic, methacrylic acid, maleic acid, and like carboxylic acids, anhydrides, salts, and mixtures thereof.

In any of the exemplary embodiments, the polycarboxylic acid may comprise a monomeric polycarboxylic acid, such as citric acid, itaconic acid, maleic acid, fumaric acid, succinic acid, adipic acid, glutaric acid, tartaric acid, trimellitic acid, hemimellitic acid, trimesic acid, tricarballylic acid, and the like, including salts or anhydrides thereof, and mixtures thereof.

The cross-linking agent may, in some instances, be pre-neutralized with a neutralization agent. Such neutralization agents may include organic and/or inorganic bases, such sodium hydroxide, ammonium hydroxide, and diethylamine, and any kind of primary, secondary, or tertiary amine (including alkanol amine). In various exemplary embodiments, the neutralization agents may include at least one of sodium hydroxide and triethanolamine.

The cross-linking agent is present in the binder composition in at least 30.0% by weight, based on the total solids content of the binder composition, including, without limitation at least 40% by weight, at least 45% by weight, at least 50% by weight, at least 52.0% by weight, at least 54.0% by weight, at least 56.0% by weight, at least 58.0% by weight, and at least 60.0% by weight. In any of embodiments disclosed herein, the cross-linking agent may be present in the binder composition in an amount from 30% to 85% by weight, based on the total solids content of the aqueous binder composition, including without limitation 50.0% to 70.0% by weight, greater than 50% by weight to 65% by weight, 52.0% to 62.0% by weight, 54.0% to 60.0% by weight, and 55.0% to 59.0% by weight.

Optionally, in addition to, instead of the polycarboxylic acid cross-linking agent discussed above, the binder composition may include an amine-based reactant, such as ammonium salts (e.g., ammonium salts of a polycarboxylic acid), amines, diammonium sulfate, proteins, peptides, amino acids, and the like. Such amine-based reactants are capable of participating in a Maillard reaction with a reducing sugar to produce melanoidins (high molecular weight, furan ring and nitrogen-containing polymers). Thus, in some exemplary embodiments, the binder composition may comprise melanoidins produced by the reaction of an amine-based reactant and one or more reducing sugars.

The aqueous binder composition may further include at least one polyol. In any of the exemplary embodiments, the polyol may comprise a monomeric polyol. The monomeric polyol may comprise a water-soluble compound having a molecular weight of less than 2,000 Daltons, including less than 1,000 Daltons, less than 750 Daltons, less than 500 Daltons, and having at least two hydroxyl (—OH) groups. Exemplary monomeric polyols include glucose, sucrose, ethylene glycol, sugar alcohols, pentaerythritol, primary alcohols, 2,2-bis(methylol)propionic acid, tri(methylol)propane (TMP), 1,2,4-butanetriol, trimethylolpropane, fructose, high fructose corn syrup (HFCS), and short-chain alkanolamines, such as triethanolamine, comprising at least three hydroxyl groups. In any of the embodiments disclosed herein, the polyol may comprise at least 3 hydroxyl groups, at least 4 hydroxyl groups, or at least five hydroxyl groups.

Sugar alcohol is understood to mean compounds obtained when the aldo or keto groups of a sugar are reduced (e.g. by hydrogenation) to the corresponding hydroxy groups. The starting sugar might be chosen from monosaccharides, oligosaccharides, and polysaccharides, and mixtures of those products, such as syrups, molasses and starch hydrolyzates. The starting sugar also could be a dehydrated form of a sugar. Although sugar alcohols closely resemble the corresponding starting sugars, they are not sugars, and particularly not reducing sugars. Thus, for instance, sugar alcohols have no reducing ability, and cannot participate in the Maillard reaction typical of reducing sugars. In some exemplary embodiments, the sugar alcohol includes glycerol, erythritol, arabitol, xylitol, sorbitol, maltitol, mannitol, iditol, isomaltitol, lactitol, cellobitol, palatinitol, maltotritol, syrups thereof and mixtures thereof. In various exemplary embodiments, the sugar alcohol is selected from glycerol, sorbitol, xylitol, and mixtures thereof. In some exemplary embodiments, the monomeric polyol is a dimeric or oligomeric condensation product of a sugar alcohol. In various exemplary embodiments, the condensation product of a sugar alcohol is isosorbide. In some exemplary embodiments, the sugar alcohol is a diol or glycol.

In some exemplary embodiments, the monomeric polyol is present in the aqueous binder composition in an amount up to about 70% by weight total solids, including without limitation, up to about 60%, 55%, 50%, 40%, 35%, 33%, 30%, 27%, 25%, and 20% by weight total solids. In some exemplary embodiments, the monomeric polyol is present in the aqueous binder composition in an amount from 2.0% to 65.0% by weight total solids, including without limitation 5.0% to 40.0%, 8.0% to 37.0%, 10.0% to 34.0%, 12.0% to 32.0%, 15.0% to 30.0%, and 20.0% to 28.0%, by weight total solids.

In various exemplary embodiments, the cross-linking agent and monomeric polyol are present in amounts such that the ratio of the number of molar equivalents of carboxylic acid groups, anhydride groups, or salts thereof to the number of molar equivalents of hydroxyl groups is from about 0.3/1 to about 1/0.3, such as from about 0.5/1 to about 1/0.5, from about 0.6/1 to about 1/0.6, from about 0.8/1 to about 1/0.8, or from about 0.9/1 to about 1/0.9.

In any of the embodiments disclosed herein, the binder composition may be free or substantially free of polyols comprising less than 3 hydroxyl groups, or free or substantially free of polyols comprising less than 4 hydroxyl groups. In any of the embodiments disclosed herein, the binder composition is free or substantially free of polyols having a number average molecular weight of 2,000 Daltons or above, such as a molecular weight between 3,000 Daltons and 4,000 Daltons. Accordingly, in any of the embodiments disclosed herein, the binder composition is free or substantially free of diols, such as glycols; triols, such as, for example, glycerol and triethanolamine; and/or polymeric polyhydroxy compounds, such as polyvinyl alcohol, polyvinyl acetate, which may be partially or fully hydrolyzed, or mixtures thereof.

In any of the embodiments disclosed herein, the aqueous binder compositions may comprise or consist of a polymeric polycarboxylic acid-based cross-linking agent and a monomeric polyol having at least four hydroxyl groups with a ratio of carboxylic acid groups to hydroxyl groups OH groups between 0.60/1 to 1/0.6.

However, in some exemplary embodiments, the polyol may comprise a polymeric polyol having at least two hydroxyl groups and a number average molecular weight of at least 2,000 Daltons. The polymeric polyol may be included as the only polyol in the binder composition, or the polymeric polyol may be included as a secondary polyol, in addition to the monomeric polyol described above.

In some exemplary embodiments, the secondary polyol comprises one or more of a polymeric polyhydroxy compound, such as a polyvinyl alcohol, polyvinyl acetate, which may be partially or fully hydrolyzed, or mixtures thereof. Illustratively, when a partially hydrolyzed polyvinyl acetate serves as the polyol component, an 80%-89% hydrolyzed polyvinyl acetate may be utilized, such as, for example Poval® 385 (Kuraray America, Inc.) and Sevol™ 502 (Sekisui Specialty Chemicals America, LLC), which are about 85% (Poval® 385) and 88% (Selvol™ 502) hydrolyzed, respectively. Another alternative is ELVANOL 51-05, available from DuPont, having a molecular weight of about 22,000-about 26,000 Daltons and a viscosity of about 5.0-6.0 centipoise, or other partially hydrolyzed polyvinyl acetates.

The secondary polyol may be present in the aqueous binder composition in an amount up to about 30% by weight total solids, including without limitation, up to about 28%, 25%, 20%, 18%, 15%, and 13% by weight total solids. In any of the exemplary embodiments, the secondary polyol may be present in the aqueous binder composition in an amount from 2.5% to 30% by weight total solids, including without limitation 5% to 25%, 8% to 20%, 9% to 18%, and 10% to 16%, by weight total solids.

In such embodiments of the binder composition that include a secondary polyol, the crosslinking agent, monomeric polyol, and secondary polyol may be present in amounts such that the ratio of the number of molar equivalents of carboxylic acid groups, anhydride groups, or salts thereof to the number of molar equivalents of hydroxyl groups is from about 1/0.05 to about 1/5, such as from about 1/0.08 to about 1/2.0, from about 1/0.1 to about 1/1.5, and from about 1/0.3 to about 1/0.66. Within this ratio, the ratio of the secondary polyol to monomeric polyol effects the performance of the binder composition, such as the tensile strength and water solubility of the binder after cure. For instance, a ratio of secondary polyol to monomeric polyol between about 0.1/0.9 to about 0.9/0.1, such as between about 0.3/0.7 and 0.7/0.3, or between about 0.4/0.6 and 0.6/0.4 provides a balance of desirable mechanical properties and physical color properties. In various exemplary embodiments, the ratio of secondary polyol to monomeric polyol is approximately 0.5/0.5.

In any of the aqueous binder compositions disclosed herein, all or a percentage of the acid functionality in the polycarboxylic acid may be temporarily blocked with the use of a protective agent, which temporarily blocks the acid functionality from complexing with the mineral wool fibers, and is subsequently removed by heating the binder composition to a temperature of at least 150° C., freeing the acid functionalities to crosslink with the polyol component and complete the esterification process, during the curing process. In any of the exemplary embodiments, 10% to 100% of the carboxylic acid functional groups may be temporarily blocked by the protective agent, including between about 25% to about 99%, about 30% to about 90%, and about 40% to about 85%, including all subranges and combinations of ranges therebetween. In any of the exemplary embodiments, a minimum of 40% of the acid functional groups may be temporarily blocked by the protective agent.

The protective agent may be capable of reversibly bonding to the carboxylic acid groups of the crosslinking agent. In any of the exemplary embodiments, the protective agent comprises any compound comprising molecules capable of forming at least one reversible ionic bond with a single acid functional group. In any of the exemplary embodiments disclosed herein, the protective agent may comprise a nitrogen-based protective agent, such as an ammonium-based protective agent; an amine-based protective agent; or mixtures thereof. An exemplary ammonium based protective agent includes ammonium hydroxide. Exemplary amine-based protective agents include alkylamines and diamines, such as, for example ethyleneimine, ethylenediamine, hexamethylenediamine; alkanolamines, such as: ethanolamine, diethanolamine, triethanolamine; ethylenediamine-N,N'-disuccinic acid (EDDS), ethylenediaminetetraacetic acid (EDTA), and the like, or mixtures thereof. In addition, the alkanolamine can be used as both a protecting agent and as a participant in the crosslinking reaction to form ester in the cured binder. Thus, the alkanolamine has a dual-functionality of protective agent and polyol for crosslinking with the polycarboxylic acid via esterification.

The protective agent functions differently than a conventional pH adjuster. A protective agent, as defined herein, only temporarily and reversibly blocks the acid functional groups in the polymeric polycarboxylic acid component. In contrast, conventional pH adjusters, such as sodium hydroxide, permanently terminate an acid functional group, which prevents crosslinking between the acid and hydroxyl groups due to the blocked acid functional groups. Thus, the inclusion of traditional pH adjusters, such as sodium hydroxide, does not provide the desired effect of temporarily blocking the acid functional groups, while later freeing up those functional groups during to cure to permit crosslinking via esterification. Accordingly, in any of the exemplary embodiments disclosed herein, the binder composition may be free or substantially free of conventional pH adjusters, such as, for example, sodium hydroxide and potassium hydroxide. Such conventional pH adjusters for high temperature applications will permanently bond with the carboxylic acid groups and will not release the carboxylic acid functionality to allow for crosslinking esterification.

Any of the binder compositions disclosed herein may further include an additive blend comprising one or more processing additives that improves the processability of the binder composition by reducing the viscosity and tackiness of the binder, resulting in a more uniform insulation product with an increased tensile strength and hydrophobicity. Although there may be various additives capable of reducing the viscosity and/or tackiness of a binder composition, conventional additives are hydrophilic in nature, such that the inclusion of such additives increases the overall water absorption of the binder composition. The additive blend may comprise one or more processing additives. Examples of processing additives include surfactants, glycerol, 1,2,4-butanetriol, 1,4-butanediol, 1,2-propanediol, 1,3-propanediol, poly(ethylene glycol) (e.g., Carbowax™), monooleate polyethylene glycol (MOPEG), silicone, dispersions of polydimethylsiloxane (PDMS), emulsions and/or dispersions of mineral, paraffin, or vegetable oils, waxes such as amide waxes (e.g., ethylene bis-stearamide (EBS)) and carnauba wax (e.g., ML-155), hydrophobized silica, ammonium phosphates, or combinations thereof. The surfactants may include non-ionic surfactants, including non-ionic surfactants with an alcohol functional groups. Exemplary surfactants include Surfynol®, alkyl polyglucosides (e.g., Glucopon®), and alcohol ethoxylates (e.g., Lutensol®).

The additive blend may include a single processing additive, a mixture of at least two processing additives, a mixture of at least three processing additives, or a mixture of at least four processing additives. In any of the embodiments disclosed herein, the additive blend may comprise a mixture of glycerol and polydimethylsiloxane.

The additive blend may be present in the binder composition in an amount from 1.0% to 20% by weight, from 1.25% to 17.0% by weight, or from 1.5% to 15.0% by weight, or from about 3.0% to about 12.0% by weight, or from about 5.0% to about 10.0% by weight based on the total solids content in the binder composition. In any of the exemplary embodiments, the binder composition may comprise at least 7.0% by weight of the additive blend, including at least 8.0% by weight, and at least 9% by weight, based on the total solids content in the binder composition. Accordingly, in any of the exemplary embodiments, the aqueous binder composition may comprise 7.0% to 15% by weight of the additive blend, including 8.0% by weight to 13.5% by weight, 9.0% by weight to 12.5% by weight, based on the total solids content in the binder composition.

In embodiments wherein the additive blend comprises glycerol, the glycerol may be present in an amount from at least 5.0% by weight, or at least 6.0% by weight, or at least 7.0% by weight, or at least 7.5% by weight, based on the total solids content of the binder composition. In any of the exemplary embodiments, the binder composition may comprise 5.0% to 15% by weight of glycerol, including 6.5% to 13.0% by weight, 7.0% to 12.0% by weight, and 7.5% to 11.0% by weight of glycerol, based on the total solids content of the binder composition.

In embodiments wherein the additive blend comprises polydimethylsiloxane, the polydimethylsiloxane may be present in an amount from at least 0.2% by weight, or at least 0.5% by weight, or at least 0.8% by weight, or at least 1.0% by weight, or at least 1.5% by weight, or at least 2.0% by weight, based on the total solids content of the binder composition. In any of the exemplary embodiments, the binder composition may comprise 0.5% to 5.0% by weight of polydimethylsiloxane, including 1.0% to 4.0% by weight, 1.2% to 3.5% by weight, 1.5% to 3.0% by weight, and 1.6% to 2.3% by weight of polydimethylsiloxane, based on the total solids content of the binder composition.

In any of the embodiments disclosed herein, the additive blend may comprise a mixture of glycerol and polydimethylsiloxane, wherein the glycerol comprises 5.0% to 15% by weight of the binder composition and the polydimethylsiloxane comprises 0.5% to 5.0% by weight of the binder composition, based on the total solids content of the binder composition. In any of the embodiments disclosed herein, the additive blend may comprise a mixture of glycerol and polydimethylsiloxane, wherein the glycerol comprises 7.0% to 12% by weight of the binder composition and the polydimethylsiloxane comprises 1.2% to 3.5% by weight of the binder composition, based on the total solids content of the binder composition.

In any of the embodiments disclosed herein, the additive blend may comprise an increased concentration of a silane coupling agent. Conventional binder compositions generally comprise less than 0.5% by weight silane and more commonly about 0.2% by weight or less, based on the total solids content of the binder composition. Accordingly, in any of the embodiments disclosed herein, the silane coupling agent(s) may be present in the binder composition in an amount from about 0.5% to about 5.0% by weight of the total solids in the binder composition, including from about 0.7% to about 2.5% by weight, from about 0.85% to about 2.0% by weight, or from about 0.95% to about 1.5% by weight. In any of the embodiments disclosed herein, the silane coupling agent(s) may be present in the binder composition in an amount up to about 1.0% by weight.

The silane concentration may further be characterized by the amount of silane on the fibers in a fibrous insulation product. Typically, fiberglass insulation products comprise between 0.001% by weight and 0.03% by weight of the silane coupling agent on the glass fibers. However, by increasing the amount of silane coupling agent that is included applied to the fibers, the amount of silane on the glass fibers increases to at least 0.10% by weight.

Alternatively, the binder composition may comprise a conventional amount of silane coupling agent, if any. In such embodiments, the silane coupling agent(s) may be present in the binder composition in an amount from 0% to less than 0.5% by weight of the total solids in the binder composition, including from about 0.05% to about 0.4% by weight, from about 0.1% to about 0.35% by weight, or from about 0.15% to about 0.3% by weight.

Non-limiting examples of silane coupling agents that may be used in the binder composition may be characterized by the functional groups alkyl, aryl, amino, epoxy, vinyl, methacryloxy, ureido, isocyanato, and mercapto. In exemplary embodiments, the silane coupling agent(s) include silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., triethoxyaminopropylsilane; 3-aminopropyltriethoxysilane and 3-aminopropyl-trihydroxy silane), epoxy trialkoxysilanes (e.g., 3-glycidoxypropylt-rimethoxysilane and 3-glycidoxypropyltriethoxysilane), methyacryl trialkoxysilanes (e.g., 3-methacryloxypropylt-rimethoxysilane and 3-methacryloxypropyltriethoxysilane), hydrocarbon trialkoxysilanes, amino trihydroxysilanes, epoxy trihydroxysilanes, methacryl trihydroxy silanes, and/or hydrocarbon trihydroxysilanes. In one or more exemplary embodiment, the silane is an aminosilane, such as γ-aminopropyltriethoxysilane.

Any of the aqueous binder compositions disclosed herein may further include an esterification catalyst, also known as a cure accelerator. The catalyst may include inorganic salts, Lewis acids (i.e., aluminum chloride or boron trifluoride), Bronsted acids (i.e., sulfuric acid, p-toluenesulfonic acid and boric acid) organometallic complexes (i.e., lithium carboxylates, sodium carboxylates), and/or Lewis bases (i.e., polyethyleneimine, diethylamine, or triethylamine). Additionally, the catalyst may include an alkali metal salt of a phosphorous-containing organic acid; in particular, alkali metal salts of phosphorus acid, hypophosphorus acid, or polyphosphoric. Examples of such phosphorus catalysts include, but are not limited to, sodium hypophosphite, sodium phosphate, potassium phosphate, disodium pyrophosphate, tetrasodium pyrophosphate, sodium tripolyphosphate, sodium hexametaphosphate, potassium phosphate, potassium tripolyphosphate, sodium trimetaphosphate, sodium tetrametaphosphate, and mixtures thereof. In addition, the catalyst or cure accelerator may be a fluoroborate compound such as fluoroboric acid, sodium tetrafluoroborate, potassium tetrafluoroborate, calcium tetrafluoroborate, magnesium tetrafluoroborate, zinc tetrafluoroborate, ammonium tetrafluoroborate, and mixtures thereof. Further, the catalyst may be a mixture of phosphorus and fluoroborate compounds. Other sodium salts such as, sodium sulfate, sodium nitrate, sodium carbonate may also (or alternatively) be used as the catalyst.

The catalyst may be present in the aqueous binder composition in an amount from about 0% to about 10% by weight of the total solids in the binder composition, including without limitation, amounts from about 1% to about 5% by weight, or from about 2% to about 4.5% by weight, or from about 2.8% to about 4.0% by weight, or from about 3.0% to about 3.8% by weight.

Optionally, the aqueous binder composition may contain at least one coupling agent. In at least one exemplary embodiment, the coupling agent is a silane coupling agent. The coupling agent(s) may be present in the binder composition in an amount from about 0.01% to about 5% by weight of the total solids in the binder composition, from about 0.01% to about 2.5% by weight, from about 0.05% to about 1.5% by weight, or from about 0.1% to about 1.0% by weight.

Non-limiting examples of silane coupling agents that may be used in the binder composition may be characterized by the functional groups alkyl, aryl, amino, epoxy, vinyl, methacryloxy, ureido, isocyanato, and mercapto. In any of the embodiments, the silane coupling agent(s) may include silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., triethoxyaminopropylsilane; 3-aminopropyl-triethoxy silane and 3-aminopropyl-trihydroxysilane), epoxy trialkoxysilanes (e.g., 3-glycidoxypropylt-rimethoxysilane and 3-glycidoxypropyltriethoxysilane), methyacryl trialkoxysilanes (e.g., 3-methacryloxypropylt-rimethoxysilane and 3-methacryloxypropyltriethoxysilane), hydrocarbon trialkoxysilanes, amino trihydroxysilanes, epoxy trihydroxysilanes, methacryl trihydroxy silanes, and/or hydrocarbon trihydroxysilanes. In any of the embodiments disclosed herein, the silane may comprise an aminosilane, such as γ-aminopropyltriethoxysilane.

The aqueous binder composition may further include a process aid. The process aid is not particularly limiting so long as the process aid functions to facilitate the formation and/or orientation of the fibers. The process aid can be used to improve binder application distribution uniformity, to reduce binder viscosity, to increase ramp height after forming, to improve the vertical weight distribution uniformity, and/or to accelerate binder de-watering in both forming and oven curing processes. The process aid may be present in the binder composition in an amount from 0% to about 10.0% by weight, from about 0.1% to about 5.0% by weight, or from about 0.3% to about 2.0% by weight, or from about 0.5% to about 1.0% by weight, based on the total solids content in the binder composition. In some exemplary embodiments, the aqueous binder composition is substantially or completely free of any process aids.

Examples of process aids include defoaming agents, such as, emulsions and/or dispersions of mineral, paraffin, or vegetable oils; dispersions of polydimethylsiloxane (PDMS) fluids, and silica which has been hydrophobized with polydi-methylsiloxane or other materials. Further process aids may include particles made of amide waxes such as ethylene bis-stearamide (EBS) or hydrophobized silica. A further process aid that may be utilized in the binder composition is a surfactant. One or more surfactants may be included in the binder composition to assist in binder atomization, wetting, and interfacial adhesion.

The surfactant is not particularly limited, and includes surfactants such as, but not limited to, ionic surfactants (e.g., sulfate, sulfonate, phosphate, and carboxylate); sulfates (e.g., alkyl sulfates, ammonium lauryl sulfate, sodium lauryl sulfate (SDS), alkyl ether sulfates, sodium laureth sulfate, and sodium myreth sulfate); amphoteric surfactants (e.g., alkylbetaines such as lauryl-betaine); sulfonates (e.g., dioctyl sodium sulfosuccinate, perfluorooctanesulfonate, per-fluorobutanesulfonate, and alkyl benzene sulfonates); phosphates (e.g., alkyl aryl ether phosphate and alkyl ether phosphate); carboxylates (e.g., alkyl carboxylates, fatty acid salts (soaps), sodium stearate, sodium lauroyl sarcosinate, carboxylate fluorosurfactants, perfluorononanoate, and per-fluorooctanoate); cationic (e.g., alkylamine salts such as laurylamine acetate); pH dependent surfactants (primary, secondary or tertiary amines); permanently charged quaternary ammonium cations (e.g., alkyltrimethylammonium salts, cetyl trimethylammonium bromide, cetyl trimethylammonium chloride, cetylpyridinium chloride, and benzetho-nium chloride); and zwitterionic surfactants, quaternary ammonium salts (e.g., lauryl trimethyl ammonium chloride and alkyl benzyl dimethylammonium chloride), and poly-oxyethylenealkylamines.

Suitable nonionic surfactants that can be used in conjunction with the binder composition include polyethers (e.g., ethylene oxide and propylene oxide condensates, which include straight and branched chain alkyl and alkaryl poly-ethylene glycol and polypropylene glycol ethers and thio-ethers); alkylphenoxypoly(ethyleneoxy)ethanols having alkyl groups containing from about 7 to about 18 carbon atoms and having from about 4 to about 240 ethyleneoxy units (e.g., heptylphenoxypoly(ethyleneoxy) ethanols, and nonylphenoxypoly(ethyleneoxy) ethanols); polyoxyal-kylene derivatives of hexitol including sorbitans, sorbides, mannitans, and mannides; partial long-chain fatty acids esters (e.g., polyoxyalkylene derivatives of sorbitan mono-laurate, sorbitan monopalmitate, sorbitan monostearate, sorbitan tristearate, sorbitan monooleate, and sorbitan tri-oleate); condensates of ethylene oxide with a hydrophobic base, the base being formed by condensing propylene oxide with propylene glycol; sulfur containing condensates (e.g., those condensates prepared by condensing ethylene oxide with higher alkyl mercaptans, such as nonyl, dodecyl, or tetradecyl mercaptan, or with alkylthiophenols where the alkyl group contains from about 6 to about 15 carbon atoms); ethylene oxide derivatives of long-chain carboxylic acids (e.g., lauric, myristic, palmitic, and oleic acids, such as tall oil fatty acids); ethylene oxide derivatives of long-chain alcohols (e.g., octyl, decyl, lauryl, or cetyl alcohols); and ethylene oxide/propylene oxide copolymers.

In at least one exemplary embodiment, the surfactants include one or more of Dynol 607, which is a 2,5,8,11-tetramethyl-6-dodecyne-5,8-diol, SURFONYL® 420, SUR-FONYL® 440, and SURFONYL® 465, which are ethoxy-lated 2,4,7,9-tetramethyl-5-decyn-4,7-diol surfactants (commercially available from Evonik Corporation (Allen-town, Pa.)), Stanfax (a sodium lauryl sulfate), Surfynol 465 (an ethoxylated 2,4,7,9-tetramethyl 5 decyn-4,7-diol), Tri-ton™ GR-PG70 (1,4-bis(2-ethylhexyl) sodium sulfosucci-nate), and Triton™ CF-10 (poly(oxy-1,2-ethanediyl), alpha-(phenylmethyl)-omega-(1,1,3,3-tetramethylbutyl)phenoxy).

Optionally, the aqueous binder composition may contain a dust suppressing agent to reduce or eliminate the presence of inorganic and/or organic particles which may have adverse impact in the subsequent fabrication and installation of the insulation materials. The dust suppressing agent can be any conventional mineral oil, mineral oil emulsion, natural or synthetic oil, bio-based oil, or lubricant, such as, but not limited to, silicone and silicone emulsions, polyeth-ylene glycol, as well as any petroleum or non-petroleum oil with a high flash point to minimize the evaporation of the oil inside the oven.

The aqueous binder composition may include up to about 15% by weight of a dust suppressing agent, including up to about 14% by weight, or up to about 13% by weight. In any of the embodiments disclosed herein, the aqueous binder composition may include between 1.0% by weight and 15% by weight of a dust suppressing agent, including about 3.0% by weight to about 13.0% by weight, or about 5.0% by weight to about 12.8% by weight.

The aqueous binder composition may also optionally include organic and/or inorganic acids and bases as pH adjusters in an amount sufficient to adjust the pH to a desired level. The pH may be adjusted depending on the intended application, to facilitate the compatibility of the ingredients of the binder composition, or to function with various types of fibers. In some exemplary embodiments, the pH adjuster is utilized to adjust the pH of the binder composition to an acidic pH. Examples of suitable acidic pH adjusters include inorganic acids such as, but not limited to sulfuric acid, phosphoric acid and boric acid and also organic acids like p-toluenesulfonic acid, mono- or polycarboxylic acids, such as, but not limited to, citric acid, acetic acid and anhydrides thereof, adipic acid, oxalic acid, and their corresponding salts. Also, inorganic salts that can be acid precursors. The acid adjusts the pH, and in some instances, as discussed above, acts as a cross-linking agent. Organic and/or inor-ganic bases can be included to increase the pH of the binder composition. The bases may be volatile or non-volatile bases. Exemplary volatile bases include, for example, ammonia and alkyl-substituted amines, such as methyl amine, ethyl amine or 1-aminopropane, dimethyl amine, and ethyl methyl amine. Exemplary non-volatile bases include, for example, sodium hydroxide, potassium hydroxide, sodium carbonate, and t-butylammonium hydroxide.

In any of the exemplary embodiments, when in an un-cured state, the binder composition may have an acidic pH, such as a pH in the range of from about 2.0 to about 5.0, including all amounts and ranges in between. In any of the embodiments disclosed herein, the pH of the binder composition, when in an un-cured state, is about 2.2 to about 4.0, including about 2.5 to about 3.8, and about 2.6 to about 3.5. After cure, the pH of the binder composition may rise to at least a pH of about 5.0, including levels between about 6.5 and about 8.8, or between about 6.8 and about 8.2.

Alternatively, the binder composition, when in an un-cured state, may be adjusted to a more alkaline pH, such as, for example, a pH between about 5 and about 10, or a pH between about 6 and about 9, or between about 7 and about 8.

The binder further includes water to dissolve or disperse the active solids for application onto the reinforcement fibers. Water may be added in an amount sufficient to dilute the aqueous binder composition to a viscosity that is suitable for its application to the reinforcement fibers and to achieve a desired solids content on the fibers. It has been discovered that the present binder composition may contain a lower solids content than traditional phenol-urea formaldehyde or carbohydrate-based binder compositions. In particular, the binder composition may comprise 5% to 35% by weight of binder solids, including without limitation, 10% to 30%, 12% to 20%, and 15% to 19% by weight of binder solids. This level of solids indicates that the subject binder com-position may include more water than traditional binder compositions.

Table 1 below provides exemplary binder compositions comprising the materials discussed above. The exemplary compositions listed in Table 1 may include optional addi-tives or materials, as set forth above.

placed in the insulation cavities of buildings. For example, the fibrous insulation product 100 may be placed in the space or cavity between two parallel, spaced apart framing mem-bers in a wall, roof, or floor frame of a building.

The fibrous insulation product 100 includes an insulation layer 102 comprising nonwoven glass fibers and a binder composition to adhere the glass fibers together. Optionally, the fibrous insulation product 100 may also include a facing 104 attached or otherwise adhered to the insulation layer 102. The fibrous insulation product 100 includes a first side surface 106, a second side surface 108 spaced apart from and opposite the first side surface 106, a third side surface 110 extending between the first side surface 106 and the second side surface 108, and a fourth side surface 112 spaced apart from and opposite the third side surface 110 and extending between the first side surface 106 and the second side surface 108. The fibrous insulation product 100 also includes a first face 114 connecting the side surfaces 106, 108, 110, 112 and a second face 116 parallel to, or generally parallel to, and opposite the first face 114 and connecting the side surfaces 106, 108, 110, 112. The fibrous insulation product 100, when uncompressed, has a length $L_1$, a width $W_1$, and a thickness $T_1$. In some embodiments, the length $L_1$ is greater than the width $W_1$ which is greater than the thickness $T_1$.

A facing 104 may be disposed on the insulation layer 102 to cover the entirety of, or a portion of, the first face 114, the second face 116, or both faces of the fibrous insulation product 100. The facing 104 may take a wide variety of different forms. The facing 104 can be a single piece or multiple different pieces or sheets of material and may include a single layer or several layers of material. In the exemplary embodiment of FIG. 1, the facing 104 is a single piece of material that covers all of the first face 114 of the fibrous insulation product 100.

The facing 104 may be made from a variety of different materials. Any material suitable for use with a fibrous insulation product may be used. For example, the facing 104 may comprise nonwoven fiberglass and polymeric media; woven fiberglass and polymeric media; sheathing materials, such as sheathing films made from polymeric materials;

TABLE 1

| Component | Exemplary Composition 1 (% By Weight of Total Solids) | Exemplary Composition 2 (% By Weight of Total Solids) | Exemplary Composition 3 (% By Weight of Total Solids) | Exemplary Composition 4 (% By Weight of Total Solids) |
|---|---|---|---|---|
| Polycarboxylic acid | 30-85 | 55-65 | 60-80 | At least 50 |
| Polyvinyl alcohol | — | — | 2.5-30 | — |
| Monomeric Polyol | 15-70 | 20-35 | 8-30 | 10-35 |
| Additive blend | Optional | Optional | — | 1.5-15 |
| Catalyst | 0.5-5.0 | 2.0-3.5 | 2-10 | 0.5-5 |
| Coupling agent | 0-2.0 | 0.12-0.5 | 0.1-3 | 0-3 |
| Uncured pH | 2-5 | 2.2-4.0 | 2-5 | 4-7 |

An exemplary fibrous insulation product 100 is illustrated in FIG. 1. The fibrous insulation product 100 may be configured in a variety of ways. In the illustrated embodi-ment of FIG. 1, the fibrous insulation product 100 is a generally box-shaped fiberglass insulation batt; however, the insulation product can be any suitable shape or size, such as for example, a rolled product or a blanket. As an insulation batt or blanket, the fibrous insulation product 100 may be scrim; cloth; fabric; fiberglass reinforced kraft paper (FRK); a foil-scrim-kraft paper laminate; recycled paper; and cal-endared paper.

A significant amount of the insulation placed in the insulation cavities of buildings is in the form of insulation blankets rolled from insulation products such as those described herein. Faced insulation products are installed with the facing 104 placed flat on the edge of the insulation cavity, typically on the interior side of the insulation cavity. Insulation products where the facing is a vapor retarder are commonly used to insulate wall, floor, or ceiling cavities that separate a warm interior space from a cold exterior space. The vapor retarder is placed on one side of the insulation product to retard or prohibit the movement of water vapor through the insulation product.

Figure 2:
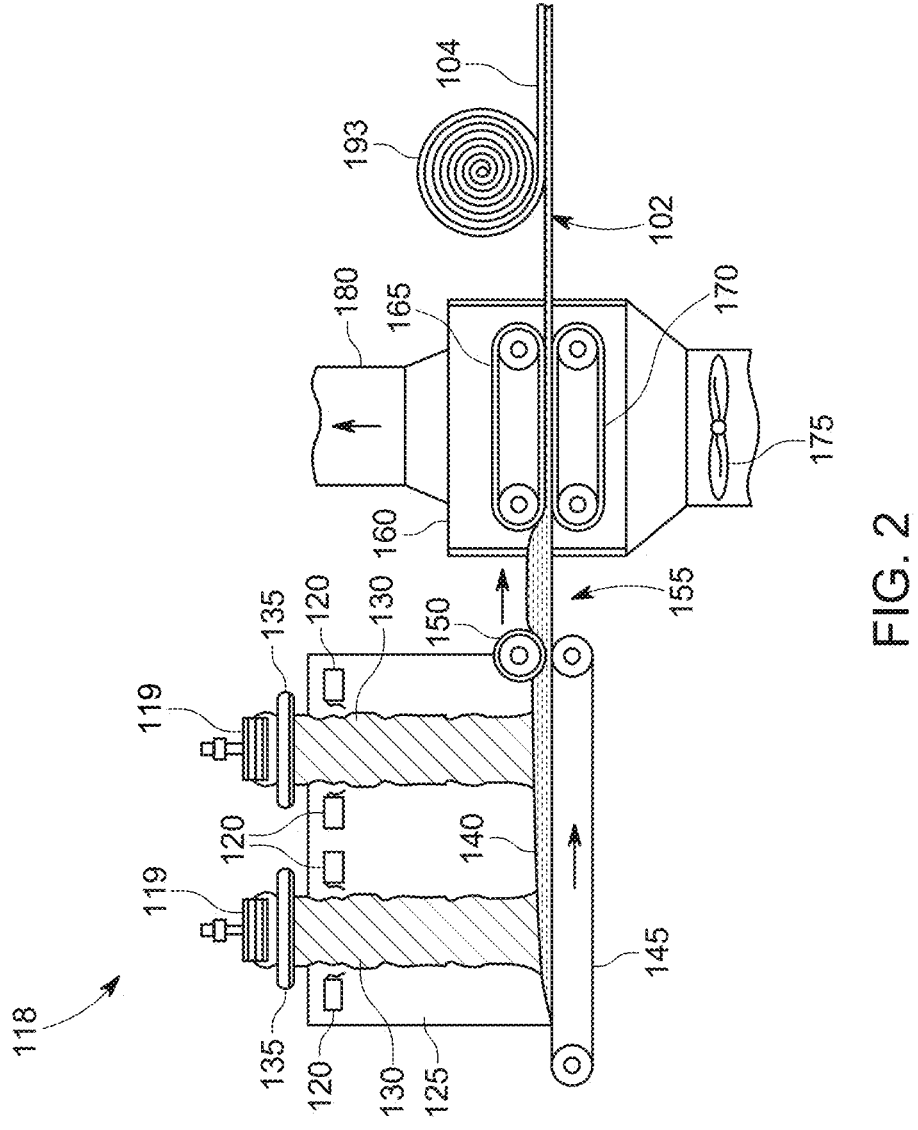
FIG. 2 is an elevational view of an exemplary embodiment of a manufacturing line for producing the fibrous insulation product of FIG. 1.

FIG. 2 illustrates an exemplary embodiment of an apparatus 118 for manufacturing the fibrous insulation product 100. The manufacture of the fibrous insulation product 100 may be carried out in a continuous process by fiberizing molten glass, coating the molten glass fibers with a binder, forming a fibrous glass pack on a porous moving conveyor (also known as a "forming chain"), and curing the binder composition to form an insulation blanket as depicted in FIG. 2. Glass may be melted in a tank (not shown) and supplied to a fiber forming device, such as one or more fiberizing spinners 119. Although spinners 119 are shown as the fiber forming device in the exemplary embodiment, it will be understood that other types of fiber forming units may be used to form the fibrous insulation product 100. The spinners 119 are rotated at high speeds. Centrifugal force causes the molten glass to pass through small orifices in the circumferential sidewalls of the fiberizing spinners 119 to form glass fibers. Glass fibers 130 of random lengths may be attenuated from the fiberizing spinners 119 and blown generally downwardly (i.e., generally perpendicular to the plane of the spinners 119) by blowers 120 positioned within a forming chamber 125.

The blowers 120 turn the glass fibers 130 downward. The glass fibers 130, prior to entering and while in transit downward in the forming chamber 125 and while still hot from the drawing operation, are sprayed with an aqueous binder composition by an annular spray ring 135 so as to result in a relatively even distribution of the binder composition throughout the glass fibers 130. Water may also be applied to the glass fibers 130 in the forming chamber 125, such as by spraying, prior to the application of the binder composition to at least partially cool the glass fibers 130.

The glass fibers 130 having the uncured aqueous binder composition adhered thereto may be gathered and formed into a fibrous pack 140 on an endless forming conveyor 145 within the forming chamber 125 with the aid of a vacuum (not shown) drawn through the fibrous pack 140 from below the forming conveyor 145. The residual heat from the glass fibers 130 and the flow of air through the fibrous pack 140 during the forming operation are generally sufficient to volatilize a majority of the water from the binder composition before the glass fibers 130 exit the forming chamber 125, thereby leaving the remaining components of the binder composition on the glass fibers 130 as a viscous or semi-viscous high-solids liquid.

The resin-coated fibrous pack 140, which is in a compressed state due to the flow of air through the fibrous pack 140 in the forming chamber 125, is then transferred out of the forming chamber 125 under exit roller 150 to a transfer zone 155 where the fibrous pack 140 vertically expands due to the resiliency of the glass fibers 130. The expanded fibrous pack 140 is then heated, such as by conveying the fibrous pack 140 through a curing oven 160 where heated air is blown through the fibrous pack 140 to evaporate any remaining water in the binder composition, cure the binder composition, and rigidly bond the glass fibers 130 together. The curing oven 160 includes a foraminous upper oven conveyor 165 and a foraminous lower oven conveyor 170, between which the fibrous pack 140 is drawn. Heated air is forced through the lower oven conveyor 170, the fibrous pack 140, and the upper oven conveyor 165 by a fan 175. The heated air exits the curing oven 160 through an exhaust apparatus 180.

Also, in the curing oven 160, the fibrous pack 140 may be compressed by the upper and lower foraminous oven conveyors 165, 170 to form the insulation layer 102 of the fibrous insulation product 100. The distance between the upper and lower oven conveyors 165, 170 may be used to compress the fibrous pack 140 to give the insulation layer 102 its predetermined thickness $T_1$. It is to be appreciated that although FIG. 2 depicts the conveyors 165, 170 as being in a substantially parallel orientation, they may alternatively be positioned at an angle relative to each other (not illustrated).

The cured binder composition imparts strength and resiliency to the insulation layer 102. It is to be appreciated that the drying and curing of the binder composition may be carried out in either one or two different steps. The two stage (two-step) process is commonly known as B-staging. The curing oven 160 may be operated at a temperature from 100° C. to 325° C., or from 250° C. to 300° C. The fibrous pack 140 may remain within the curing oven 160 for a period of time sufficient to crosslink (cure) the binder composition and form the insulation layer 102.

Once the insulation layer 102 exits the curing oven 160, a facing material 193 may be placed on the insulation layer 102 to form the facing layer 104. The facing material 193 may be adhered to the first face 114, to the second face 116, or both faces of the insulation layer 102 by a bonding agent (not shown) or some other means (e.g., stitching, mechanical entanglement) to form the fibrous insulation product 100. Suitable bonding agents include adhesives, polymeric resins, asphalt, and bituminous materials that can be coated or otherwise applied to the facing material 193. The fibrous insulation product 100 may subsequently be rolled for storage and/or shipment or cut into predetermined lengths by a cutting device (not illustrated). It is to be appreciated that, in some exemplary embodiments, the insulation layer 102 that emerges from the curing oven 160 is rolled onto a take-up roll or cut into sections having a desired length and is not faced with a facing material 193.

It has been surprisingly discovered that fibrous insulation products with desirable thermal and material efficiency can be manufactured utilizing fine glass fibers with diameters below 3.81 microns or 15 HT, at a lower than expected product weight and thickness. Insulation products formed with fibers of an average diameter below 15 HT may hereinafter be referred to interchangeably as "fine fiber" insulation products or "inventive" fibrous insulation products.

Not wishing to be bound by theory, it is believed that a unique combination of thin, sub-15 HT diameter fibers, a low viscosity formaldehyde-free binder composition, and certain processing parameters facilitates the orientation of more fibers (or fiber segments) along a plane that is generally parallel to the forming chain (referred to herein at the $L_1$ direction or machine direction) within a certain degree. Therefore, the inventive fibrous insulation product produced therefrom has a fiber orientation more aligned along the $L_1$ direction than is seen in otherwise comparable insulation products formed with fibers having an average fiber diameter above 15 HT. Thus, when the inventive fibrous insulation product is installed into a wall cavity, ceiling, floor, or similar building structure, the oriented fibers are aligned in a plane more perpendicular to the direction of heat flow, thereby reducing the product's ability to conduct heat through the thickness of the material.

Figure 3:
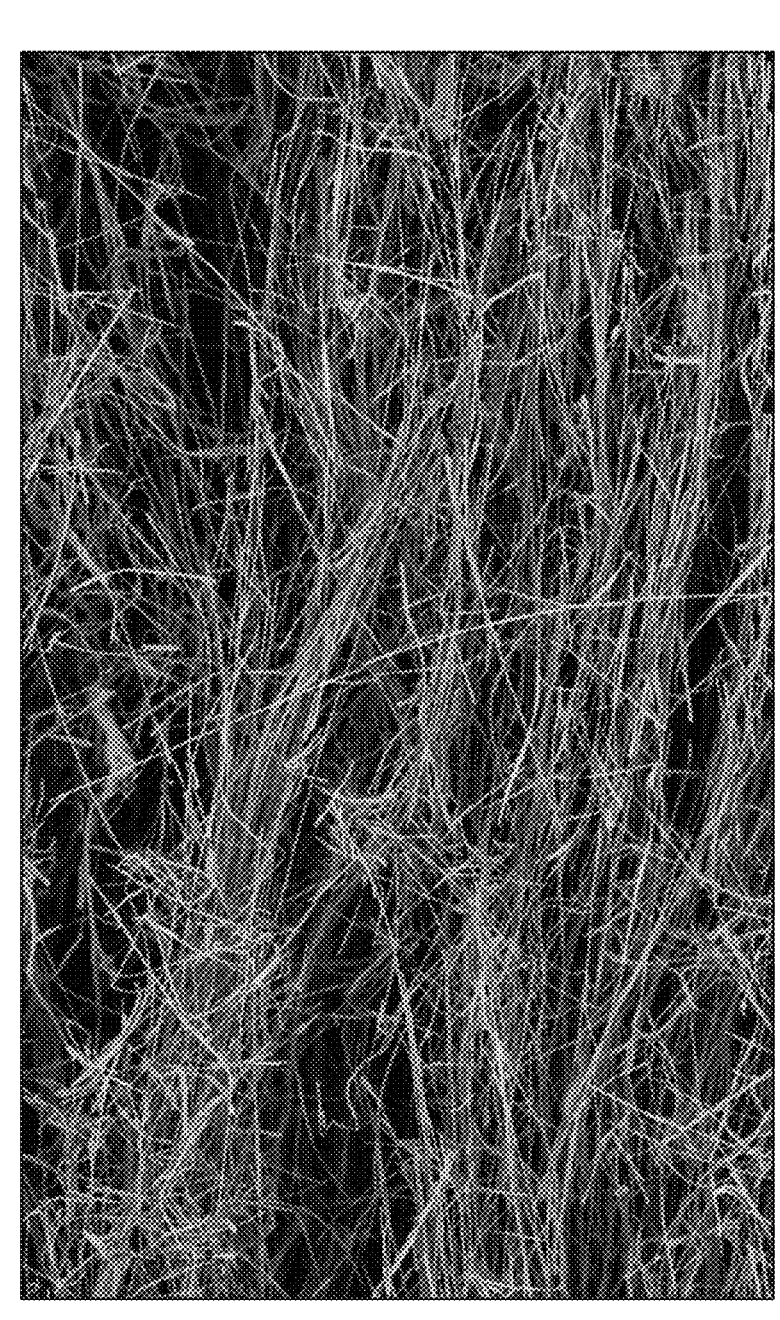
FIG. 3 is a scanning electron microscope ("SEM") image illustrating a section of an exemplary fibrous insulation product formed with glass fibers having an average fiber diameter of 14.5 HT.

FIG. 3 is an SEM image illustrating the above-described orientation of fibers (or fiber sections) along a plane that is generally more parallel to the plane in the $L_1$ direction. The SEM image was acquired from a fine fiber insulation product 200 having an R-value of 22, comprising glass fibers with an average fiber diameter of 14.5 HT and a formaldehyde-free binder composition comprising a monomeric polyol and a polycarboxylic acid cross-linking agent. The SEM image in FIG. 3 illustrates a 2.5 mm×1.5 mm product sample and measures localized fiber vectors (fiber sections in a particular plane).

Figure 4:
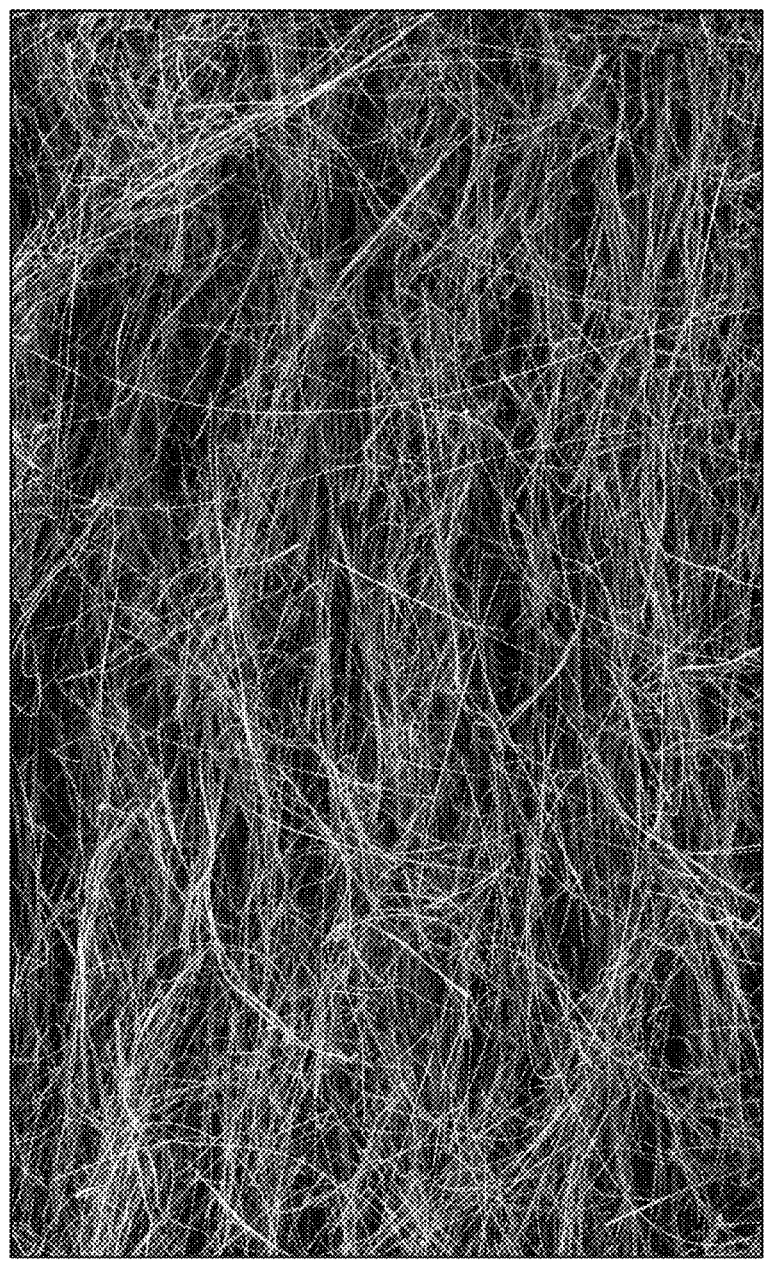
FIG. 4 is an SEM image illustrating a section of an exemplary fibrous insulation product formed with glass fibers having an average fiber diameter of 14.5 HT.
Figure 5:
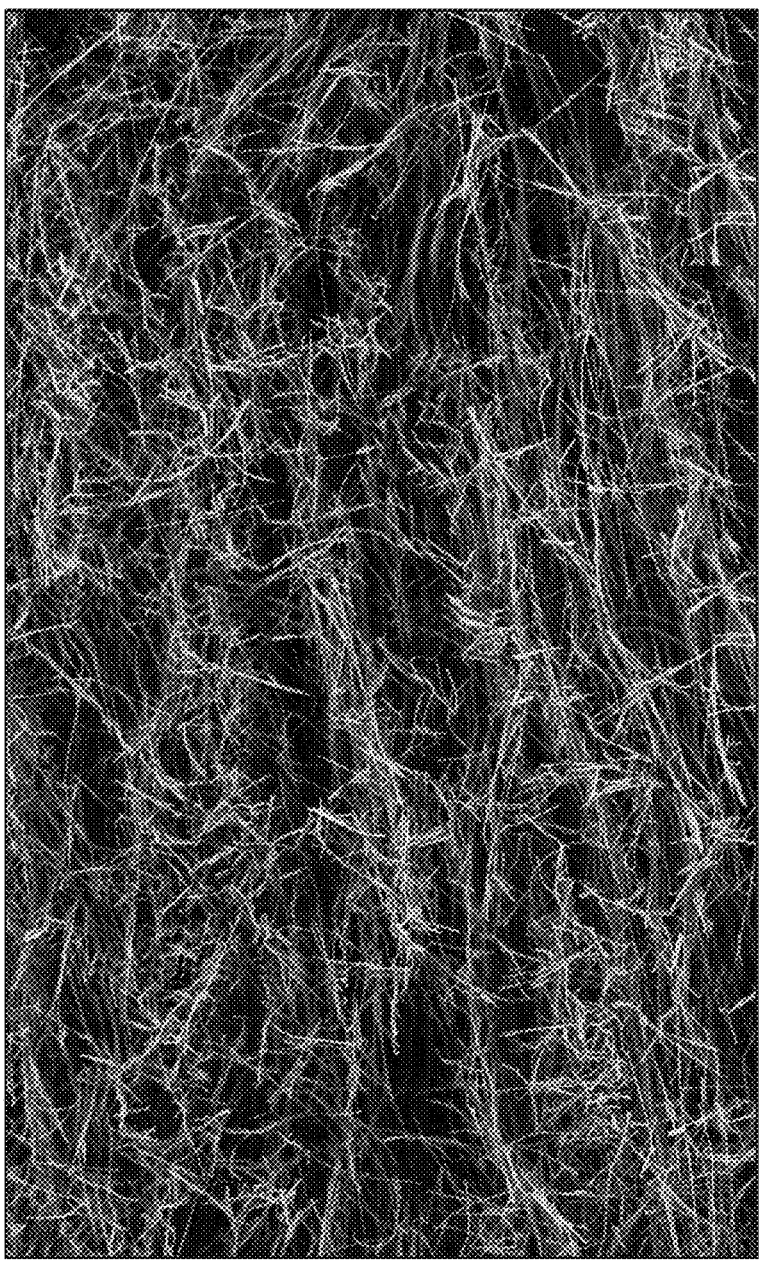
FIG. 5 is an SEM image illustrating a section of a conventional fibrous insulation product formed with glass fibers having an average fiber diameter of 16.7 HT and an insulation value of R-21.

FIGS. 4 and 5 are SEM images that further illustrate fibrous insulation product samples, with the product sample in FIG. 4 comprising glass fibers with an average fiber diameter of 14.5 HT and an R-value of 22 (hereinafter referred to as Sample A); and the product sample in FIG. 5 comprising glass fibers with an average fiber diameter of 16.7 HT, the product sample having an insulation value of R21 (hereinafter referred to as Sample B). The SEM images of Samples A and B were acquired using Thermo Scientific Prisma SEM and the images were stitched using the Thermo Scientific MAPS software. The samples were cut in machine direction cross sections, mounted on SEM stubs using carbon glue and carbon paste, and sputter coated with Au. The fiber orientation measurements and quantifications were accessed using the Orientation J plug-in from the Image J software. Gaussian window sigma was set to 1 pix and Gaussian Gradient was selected for Structure Tensor.

Figure 6:
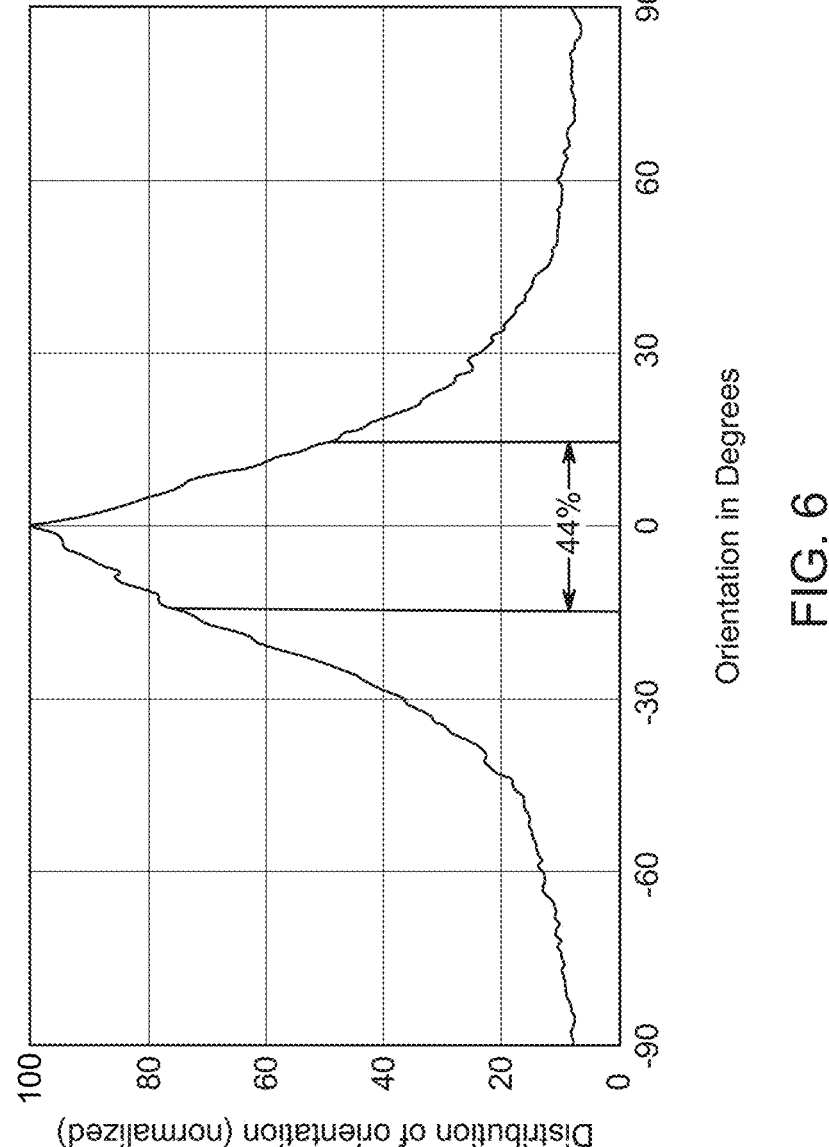
FIG. 6 is a graphical representation of the fiber orientation distribution within +/−15° of a plane parallel to the product length L$_1$ (0°) taken from the cross-section along the machine direction of an exemplary fibrous insulation product formed with glass fibers having an average fiber diameter of 14.5 HT.
Figure 7:
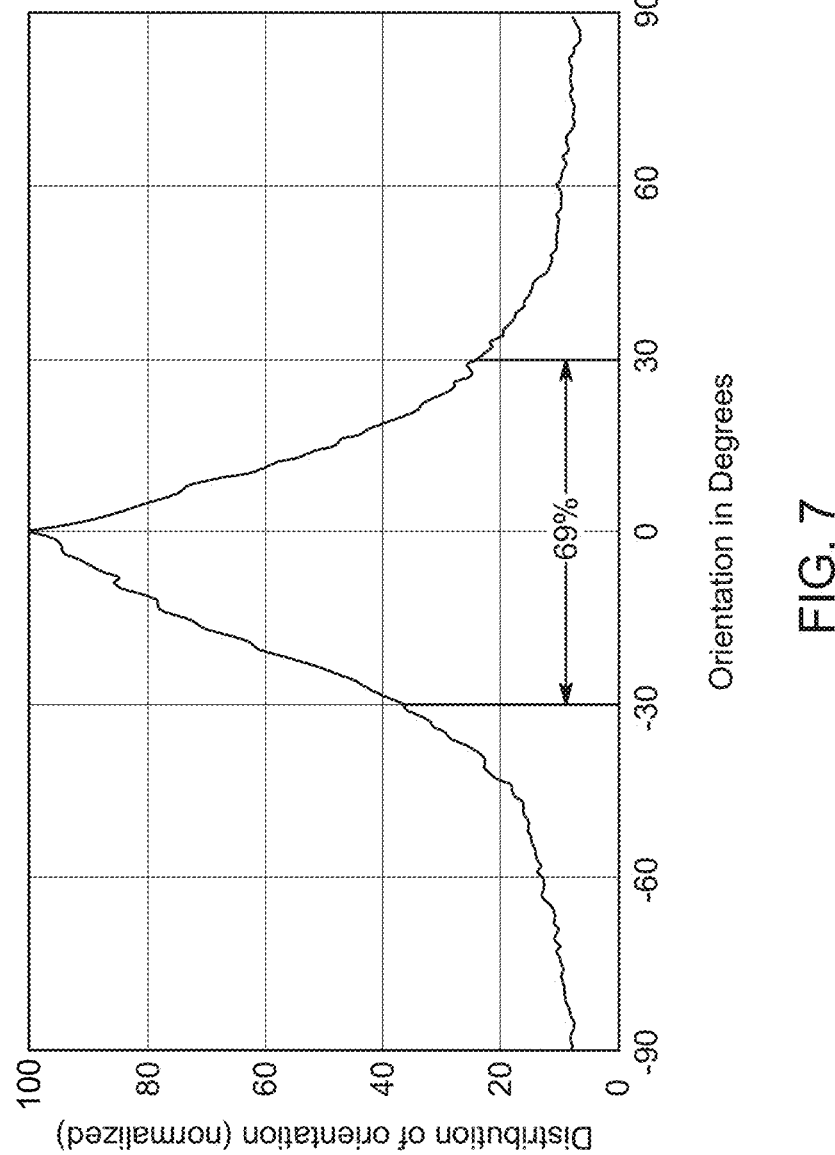
FIG. 7 is a graphical representation of the fiber orientation distribution within +/−30° of a plane parallel to the product length L$_1$ (0°) taken from the cross-section along the machine direction of an exemplary fibrous insulation product formed with glass fibers having an average fiber diameter of 14.5 HT.
Figure 8:
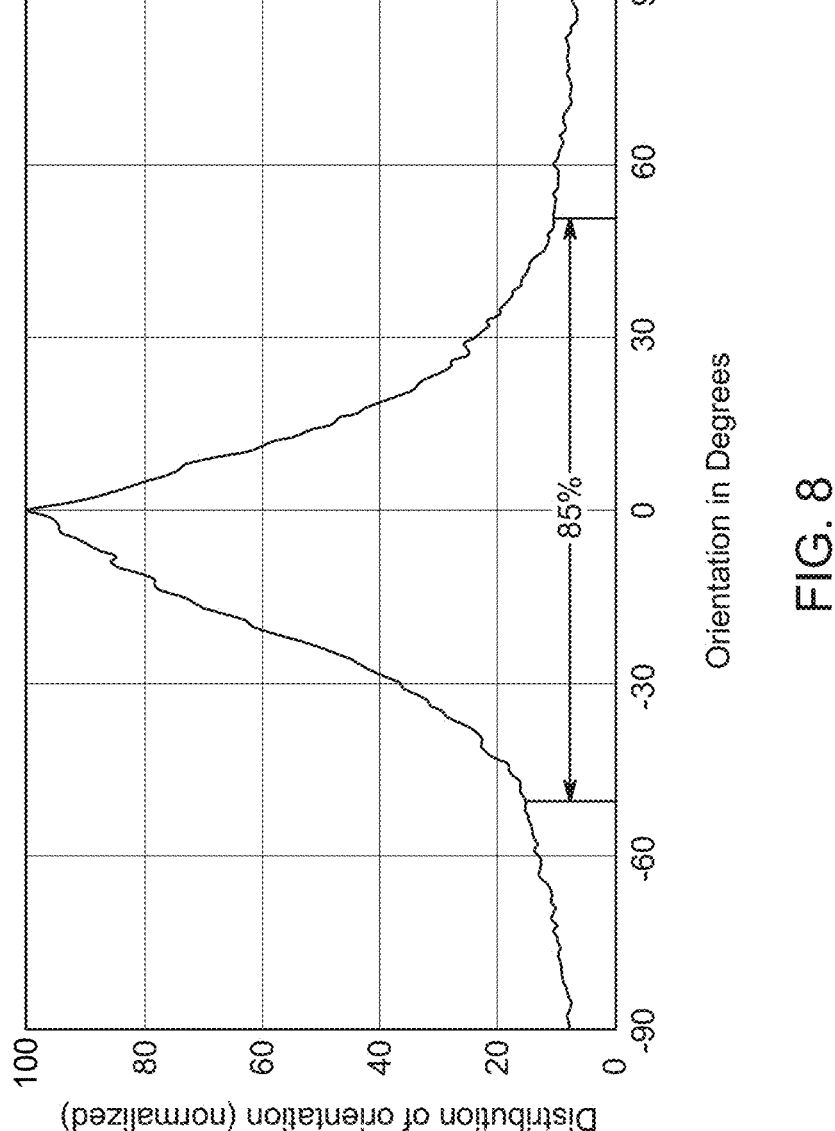
FIG. 8 is a graphical representation of the fiber orientation distribution within +/−50° of a plane parallel to the product length $L_1$ (0°) taken from the cross-section along the machine direction of an exemplary fibrous insulation product formed with glass fibers having an average fiber diameter of 14.5 HT.

The surface area (5.24 mm×3.14 mm) for each of Samples A and B in the machine direction was imaged and analyzed for orientation distribution. To analyze orientation distribution, localized glass fibers (or fiber vectors or sections thereof) were measured. The orientation frequency (normalized) versus orientation (degrees) was plotted and provided for each sample. FIGS. 6-8 illustrate the weight percent of the fibers (or fiber vectors or sections thereof) in Sample A within ranges of +/−50°, +/−30°, and +/−15° from a common plane (0°), horizontal to the product length $L_1$.

It was surprisingly discovered that an increased proportion of glass fibers (or fiber vectors or sections thereof) were oriented along a common plane, compared to insulation products having the same R-value, but with glass fibers with an average diameter of greater than 15 HT. Particularly, in any of the exemplary embodiments, at least 30% by weight of the fibers (or fiber vectors or sections thereof) in the fine fiber insulation product may be oriented within +/−15° of a common plane. FIG. 6 illustrates a graph outlining the exemplary fiber orientation distribution within +/−15° of a common plane in an inventive fibrous insulation product comprising glass fibers with an average fiber diameter of 14.5 HT. In such embodiments, the fine fiber insulation product may comprise or consist of fibers whereby at least 35% by weight, at least 40% by weight, and at least 44% by weight, of the fibers (or fiber vectors or sections thereof) are oriented within +/−15° of a common plane. In any of the exemplary embodiments, the common plane may be a plane parallel to the insulation product's length and width.

It was further discovered that in any of the exemplary embodiments, at least 50% by weight, or at least 55% by weight of the glass fibers (or fiber vectors or sections thereof) in the fibrous insulation products may be oriented within +/−30° of a common plane. FIG. 7 illustrates a graph outlining the exemplary fiber orientation distribution within +/−30° of a common plane within an inventive fibrous insulation product comprising glass fibers with an average fiber diameter of 14.5 HT. In such embodiments, the fibrous insulation product may comprise or consist of fibers whereby at least 57% by weight, at least 60% by weight, at least 65% by weight, and at least 69% by weight of the fibers (or fiber vectors or sections thereof) are oriented within +/−30° of a common plane. In any of the exemplary embodiments, the common plane may be a plane parallel to the insulation product's length and width.

It yet further exemplary embodiments, at least 75% by weight of the fibers (or fiber vectors or sections thereof) in the fine fiber insulation product are oriented within +/−50° of a common plane. FIG. 8 illustrates a graph outlining the exemplary fiber orientation distribution within +/−50° of a common plane within an inventive fibrous insulation product comprising glass fibers with an average fiber diameter of 14.5 HT. In such embodiments, the fibrous insulation product may comprise or consist of fibers whereby at least 78% by weight, at least 80% by weight, at least 82% by weight, and at least 85% by weight of the fibers (or fiber vectors or sections thereof) are oriented within +/−50° of a common plane. In any of the exemplary embodiments, the common plane may be a plane parallel to the insulation product's length and width.

Figure 9B:
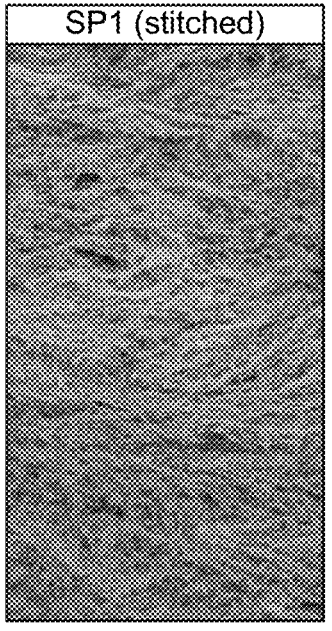
FIG. 9(*a*) is an SEM image illustrating the fiber orientation of a 24 mm×16 mm section of an exemplary fine fiber insulation product formed with glass fibers having an average fiber diameter of about 14 HT.
Figure 9B:
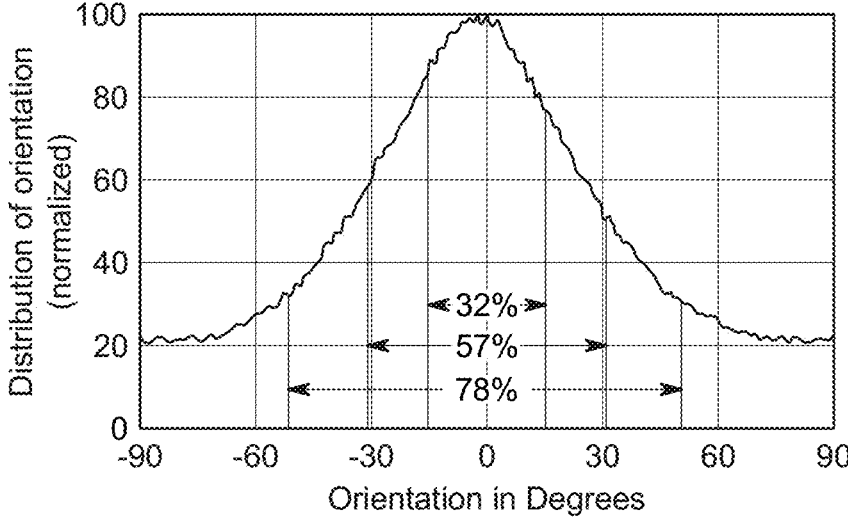

FIG. 9(*a*) is an SEM image illustrating the fiber orientation of an enlarged sample size area (24 mm×16 mm) of an exemplary fine fiber insulation product, formed in accordance with the subject invention (herein after referred to as Sample C). Sample C has an R-value of 22 and comprises glass fibers with an average fiber diameter of about 14 HT and a formaldehyde-free binder composition comprising between about 25-30 wt. % of sorbitol and between about 65-70 wt. % of a polyacrylic acid cross-linking agent, with a viscosity of about 2,000-3,000 cps at 60%-65% solids. The aqueous binder composition of Sample C has a viscosity of less than 12,000 cps at a solids content of 74.5%, and a viscosity below 6,000 cps at 70% solids and below.

The binder composition, The SEM image in FIG. 9(*a*) was used to measures localized fiber vector orientation (fiber sections in a particular plane).

Figure 10A:
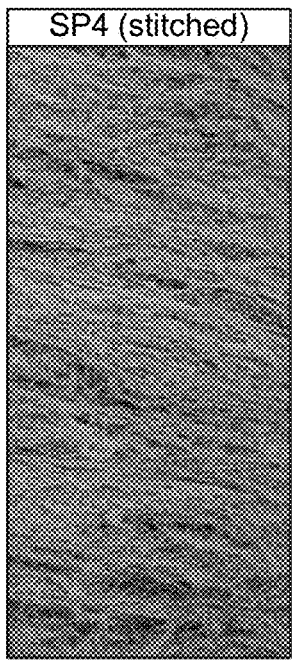
FIG. 10(*a*) is an SEM image illustrating the fiber orientation of a 24 mm×16 mm section of an exemplary fine fiber insulation product formed with glass fibers having an average fiber diameter of about 14 HT.
Figure 10B:
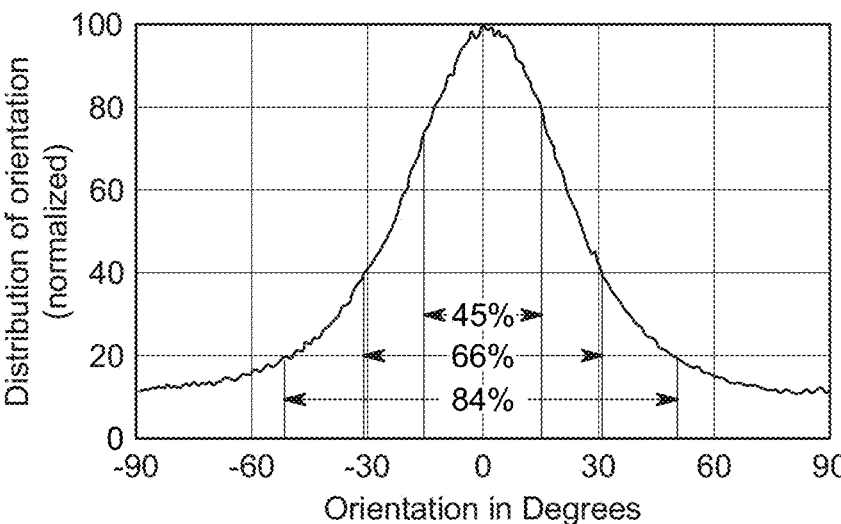

Comparatively, but also within the present inventive concepts, FIG. 10(*a*) is an SEM image illustrating the fiber orientation of a fine fiber insulation product with an R-value of 22, comprising glass fibers with an average fiber diameter of about 14 HT and a formaldehyde-free binder composition comprising between about 35-45 wt. % of sorbitol and between about 35-45 wt. % of a polyacrylic acid cross-linking agent, with a viscosity of less than 2,000 cps at 60%-65% solids (hereinafter referred to as Sample D). The aqueous binder composition of Sample D has a viscosity of less than 12,000 cps at a solids content of 74.5%, and a viscosity below 6,000 cps at 70% solids and below.

The SEM images of Samples C and D were acquired using Thermo Scientific Prisma SEM and the images were stitched using the Thermo Scientific MAPS software. The samples were cut in machine direction cross sections, mounted on SEM stubs using carbon glue and carbon paste, and sputter coated with Au. Fiber orientation measurements and quantifications were accessed using the Orientation J plug-in from the Image J software. Gaussian window sigma was set to 1 pix and Gaussian Gradient was selected for Structure Tensor.

The surface area (24 mm*16 mm) for each of Sample C and Sample D in the machine direction was imaged and analyzed for orientation distribution. As with Samples A and D, localized glass fibers (or fiber vectors or sections thereof) from Samples C and D were measured and analyzed for orientation distribution. The orientation frequency (normalized) versus orientation (degrees) was plotted and provided for each sample. FIGS. 9(*b*) and 10(*b*) illustrate the weight percent of the fibers (or fiber vectors or sections thereof) in Samples C and D, respectively, within ranges of +/−50°, +/−30°, and +/−15° from a common plane (0°), horizontal to the product length $L_1$.

It was surprisingly discovered that decreasing the binder viscosity used to form Sample D increased the proportion of glass fibers (or fiber vectors or sections thereof) oriented along a common plane. Particularly, as illustrated in FIG. 9(b) and below in Table 2, 32.94% by weight of the fibers (or fiber vectors or sections thereof) in Sample C were oriented within +/−15° of a common plane, 57.07% by weight were oriented within +/−30° of a common plane, and 78.87% by weight were oriented within +/−50° of a common plane. As further illustrated in FIG. 10(b) and below in Table 2, 45.14% by weight of the fibers (or fiber vectors or sections thereof) in Sample D were oriented within +/−15° of a common plane, 66.23% by weight were oriented within +/−30° of a common plane, and 84.03% by weight were oriented within +/−50° of a common plane. As explained above, the common plane may be a plane parallel to the insulation product's length and width.

TABLE 2

| Orientation within degree of common plane | Sample C | Sample D |
| --- | --- | --- |
| +/−15° | 32.94% | 45.14% |
| +/−30° | 57.07% | 66.23% |
| +/−50° | 78.87% | 84.03% |

Additionally, although at least a portion of the fibers (or fiber vectors or sections thereof) within the fibrous insulation product are oriented along a plane generally parallel to the forming chain or "$L_1$ direction," the fibrous insulation product may further include a portion of fibers (or fiber vectors or sections thereof) oriented along a plane generally perpendicular to the $L_1$ direction. Such "dual oriented" fibrous insulation products demonstrate superior thermal properties, while also exhibit improved recovery and/or resistance to compressive forces. The dual oriented fibrous insulation products may comprise at least 10% by weight of the fibers (or fiber vectors or sections thereof) oriented along a plane generally perpendicular to the $L_1$ direction, including at least 15% by weight, at least 18% by weight, at least 20% by weight, at least 25% by weight, at least 28% by weight, and at least 30% by weight of the fibers (or fiber vectors or sections thereof).

Figures 11A, 11B, 11C:
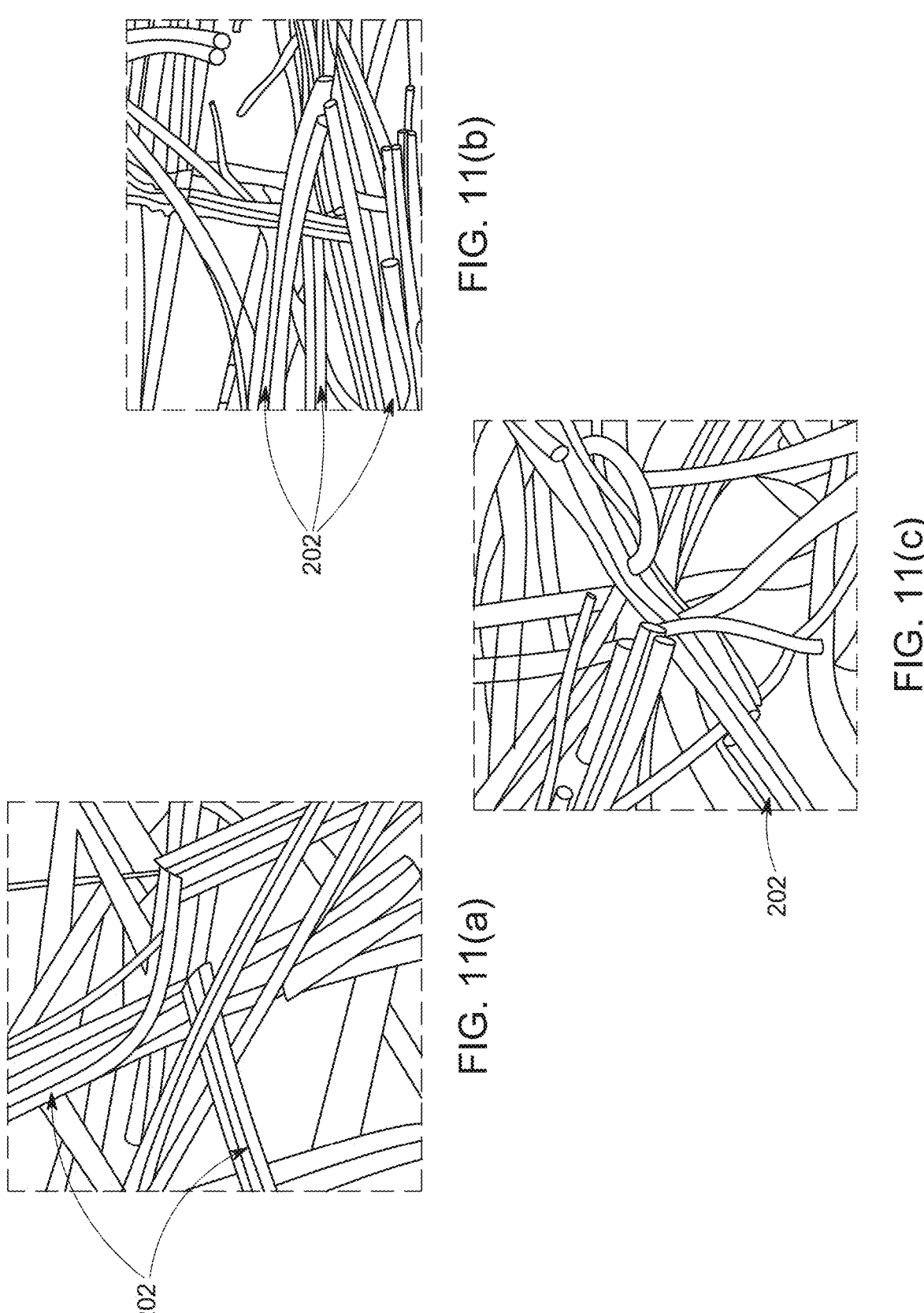
FIGS. 11(*a*)-11(*c*) are SEM images showing parallel fiber bundles present in an exemplary fibrous insulation product formed with glass fibers having an average fiber diameter of 14.5 HT.
Figures 12A, 12B, 12C:
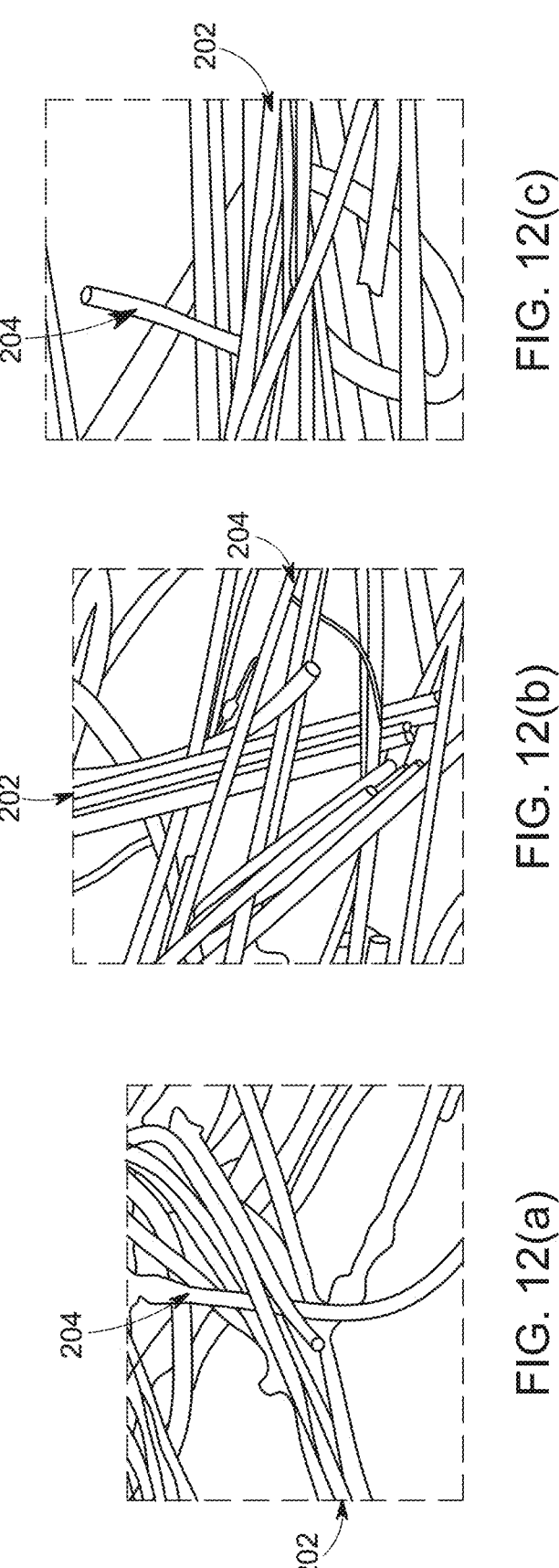
FIGS. 12(*a*)-12(*c*) are SEM images showing parallel fiber bundles present in an exemplary fibrous insulation product formed with glass fibers having an average fiber diameter of 14.5 HT.

In some exemplary embodiments, the fibrous insulation product has an increased presence of parallel fiber bundles 202, comprising at least two fibers oriented in a substantially parallel direction and bound to one another at one or more points along the length of the fibers. The magnified SEM images of FIGS. 11(a)-11(c) illustrate the parallel fiber bundles present in the fibrous insulation product. FIGS. 12(a)-12(c) provide further magnified SEM images of the fibrous insulation product shown in FIG. 3, further illustrating the prevalence of parallel fiber bundles. The parallel fiber bundles 202 may form junctions with a single fiber 204 or with other parallel fiber bundles 202.

In any of the exemplary embodiments, at least 15% by weight of the fibers in the fibrous insulation product 200 may be at least partially included in a parallel fiber bundle. In other exemplary embodiments, at least 20% by weight of the fibers in the fibrous insulation product are at least partially included in a parallel fiber bundle, including at least 25% by weight, at least 28% by weight, at least 30% by weight, at least 35% by weight, at least 40% by weight, at least 45% by weight, and at least 50% by weight of the fibers in fibrous insulation product.

Figure 13B:
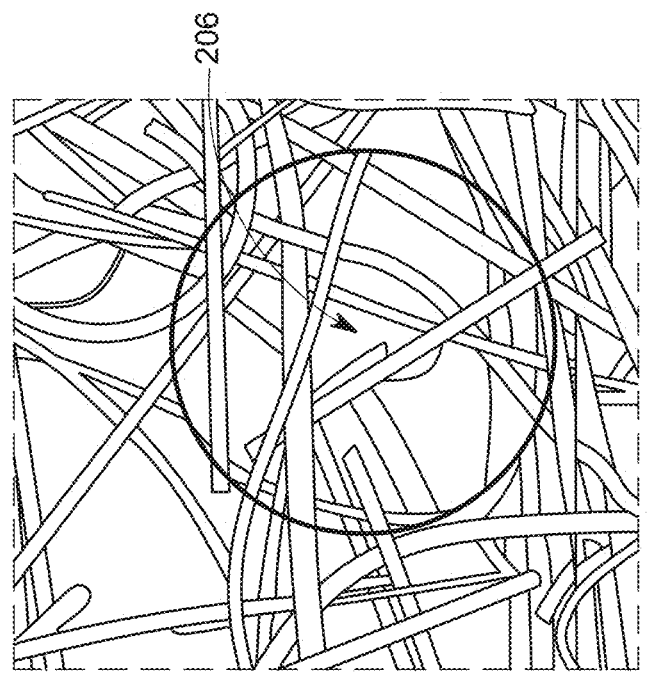
FIGS. 13(*a*)-13(*b*) are SEM images showing binder gussets present in an exemplary fibrous insulation product formed with glass fibers having an average fiber diameter of 14.5 HT.
Figure 13A:
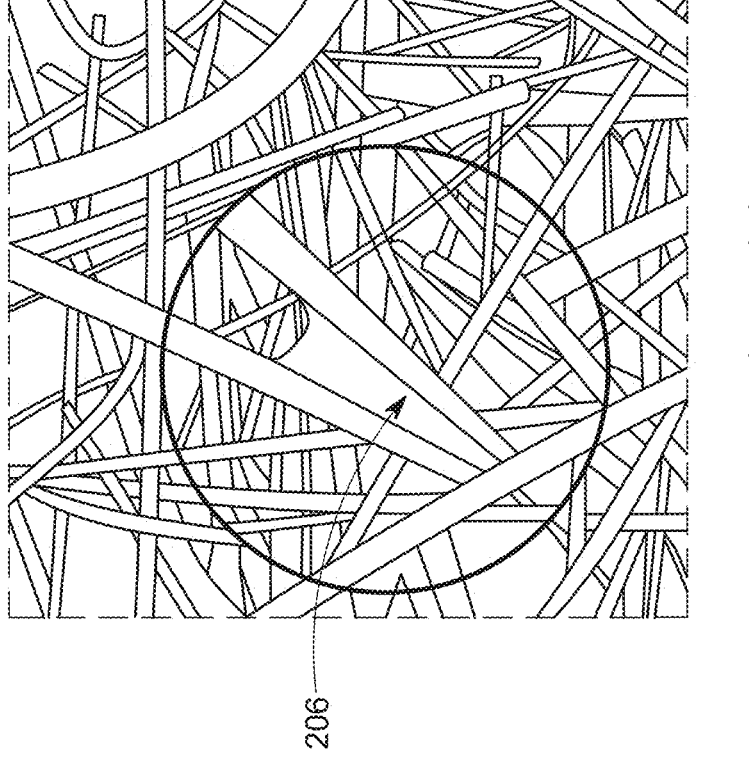

It has further been discovered that in any of the exemplary embodiments disclosed herein, the fibrous insulation product may have a reduced presence of binder gussets extending between at least two fibers. As defined herein, a binder "gusset" means a portion of cured binder composition extending between at least two fibers, usually in a triangular or rhomboidal shape, similar to an angled bracket. The binder gussets are measured by means of microscopy (e.g., optical microscopy or scanning electron microscopy). In the case of optical microscopy, the use of a refractive index solution to "hide" the glass fibers facilitates the identification of binder-fiber junctions and gussets. SEM images illustrating exemplary binder gussets are provided in FIGS. 13(a) and 13(b).

Binder gussets form between non-parallel fibers, indicating that the fibers are oriented in distinct planes. Not wishing to be bound by theory, it is believed that minimizing binder gussets and increasing the presence of binder composition along the length of fibers is beneficial in both improving uniform orientation and also increasing the presence of parallel fiber bundles.

Due to the increased uniformity in fiber orientation, in some exemplary embodiments, no more than 40% by weight of the binder composition present in the fibrous insulation product is located within a binder gusset. In any of the exemplary embodiments, no more than 35% by weight of the binder composition is located within binder gussets, including no more than 30% by weight, no more than 25% by weight, no more than 20% by weight, no more than 15% by weight, no more than 10% by weight, and no more than 5% by weight.

Moreover, further due to the increased uniformity in fiber orientation, no greater than 75% by weight of the binder is located within a binder node, which is the portion of the binder composition distributed at the intersection between two or more crossed fibers. In some exemplary embodiments, the amount of binder located within binder nodes is limited to no greater than 60% by weight, including no greater than 50% by weight, no greater than 45% by weight, and no greater than 40% by weight.

As mentioned above, it is believed that various product and product parameters impact the orientation of the fibers in the fine fiber insulation product. Not intended to be bound by theory, it is believed that the increased presence of fibers (or fiber vectors or sections thereof) oriented in a plane generally parallel to the $L_1$ direction at least partially results from the synergistic combination of small diameter glass fibers (i.e., average fiber diameter of less than or equal to 3.81 microns (or 15 HT)) with a low-viscosity formaldehyde-free binder composition. Particularly, at a temperature of 25° C., the binder composition has a viscosity of no greater than 90,000 cP at a solids concentration of 65%-70% by weight, including a viscosity of no greater than 50,000 cP, no greater than 25,000 cP, no greater than 15,000 cP, no greater than 10,000 cP, and no greater than 4,000 cP at 25° C. and a solids concentration of 65%-70% by weight.

In addition to impacting fiber orientation, the low viscosity of the binder composition allows for a reduction in fiber pack moisture on the "ramp" as the pack moves from the forming chamber into the curing oven. It is important that the ramp moisture be low enough as the fiber pack enters the curing oven in order for the product to fully and consistently cure throughout the entire thickness of the pack. In some exemplary embodiments, the viscosity of the binder composition is adjusted to ensure a ramp moisture level of no greater than 7%, including no greater than 5%, no greater than 3%, and no greater than 2%.

The fibrous insulation product has a binder content (LOI) of less than or equal to 10% by weight of the fibrous insulation product, or less than or equal to 8.0% by weight of the fibrous insulation product, or less than or equal to 6.0% by weight of the fibrous insulation product, or less than or equal to 3.0% by weight of the fibrous insulation pack. In any of the exemplary embodiments, the insulation product has a binder content (LOI) of 1.0% to 10.0% by weight of the fibrous insulation product, including between 2.0% to 8.0% by weight, 2.5% to 6.0% by weight, or 3.0% to 5.0% by weight. The relatively low amount of binder contributes to the flexibility of the final insulation product. In any of the exemplary embodiments, the fibrous insulation product has an LOI that is less than 4.5%, including less than 4.2%, less than 4.0%, less than 3.8%, and less than 3.5%.

Not intending to be bound by theory, the orientation of fine diameter fibers (i.e., fibers having an average fiber diameter less than or equal to 15 HT or 3.81 microns) in a plane that is generally more parallel to the $L_1$ (or machine) direction plane has resulted in the formation of fibrous insulation products with surprisingly improved thermal performance and overall material efficiency. The thermal performance of a fiberglass insulation product is based on the R-value of the fiberglass insulation product, which is a measure of the product's resistance to heat flow. The R-value is defined by Equation (1):

$$\text{Equation (1): } R = T_1/k \qquad (1)$$

where "$T_1$" is the thickness of the insulation product expressed in inches, "k" is the thermal conductivity of the insulation product expressed in BTU·in/hr·ft$^{2\circ}$ F., and "R" is the R-value of the insulation expressed in hr·ft$^{2\cdot\circ}$ F./BTU.

As used herein, an insulation product's thickness ($T_1$) may be determined in accordance with ASTM C167-18 and both k-value and area weight (in lb/ft$^2$) may be determined in accordance with ASTM C518-17 or ASTM C177-19.

An insulation product's R-value, thermal conductivity, and material efficiency are parameters that provide an indication of the thermal performance of the insulation product. Material efficiency ("ME") may be defined by Equation (2):

$$ME = R\text{-value}/W, \qquad \text{Equation (2)}$$

expressed in R·ft$^2$/lb, where "R" is the R-value of the insulation product and "W" is the insulation product's area weight in lb/ft$^2$. ME measures how efficiently an insulation product resists heat flow and is a metric that can be used to quantify the performance of a fiberglass insulation batt. To achieve greater values of R·ft$^2$, insulation providers generally increase the amount of insulation material (in pounds-mass (lb)). Thus, insulation that provides higher R·ft$^2$ per pound of material is desirable and this is measured by ME (i.e., thermal insulating benefit of a product divided by the amount of material used to provide the thermal insulating benefit).

Thermal Conductivity

The fine fiber insulation products of the subject invention have demonstrated a surprisingly larger decrease in thermal conductivity for a given density than expected. For example, a 1995 publication by Saint Gobain (Langlais, C., Guilbert, G., Banner, D., and Klarsfeld, S (1995). Influence of the Chemical Composition of Glass on Heat Transfer through Glass Fiber Insulations in Relation to Their Morphology and Temperature. J. Thermal Insulation and Building Envs., 18, 350-376) (hereinafter "SG Publication") details a theoretical approach to predicting thermal performance of fibrous insulants. The SG Publication indicates that apart from temperature and density, the mean diameter of fibers has been found as a means to reduce thermal conductivity and provides data illustrating the impact of fiber diameter on thermal conductivity. Applicants have developed proprietary modeling teachings, independent of the SG Publication, that predict near identical curves as shown in the SG Publication. Thus, the data presented in the SG Publication (hereinafter "Expected Results") is considered indicative of the expected thermal performance of fiberglass insulation at various density and fiber diameters.

Figure 14:
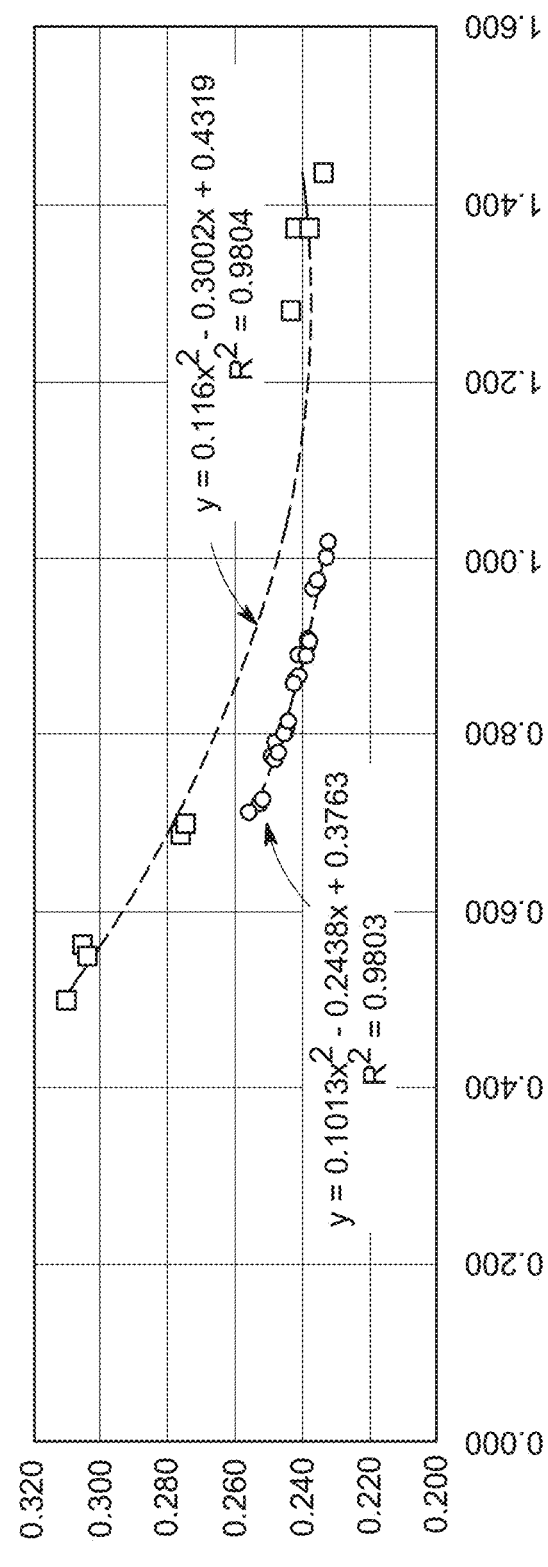
FIG. 14 graphically illustrates a predicted thermal conductivity (k-value) curve per product density compared to an actual thermal conductivity (k-value) curve per product density.

However, the thermal conductivity values of the inventive fiberglass insulation product having an average fiber diameter of 3.6 microns over a density range of 0.2 pcf to 1.6 pcf is unexpectedly lower than the predicted thermal conductivity values, based on the Expected Results. FIG. 14 illustrates the difference between the Expected Results (based on a fiberglass insulation product having an average fiber diameter of 3 microns) and the measured thermal conductivity of the inventive 3.6 micron fiberglass insulation product. As illustrated, the thermal conductivity values established by the Expected Results correspond to Formula (I):

$$y = 0.116x^2 - 0.3002x + 0.4319 \qquad \text{Formula (I)}$$

where y is the thermal conductivity (k-value), expressed as BTU-in/(hr·ft$^{2\cdot\circ}$ F.), and x is the product density, expressed in lb/ft$^3$ ("pcf"). Formula (I) has a R$^2$=0.9804, indicating a high degree of accuracy in the equation. In contrast, the measured thermal conductivity values for the inventive 3.6 micron insulation product produced Formula (II):

$$y = 0.1013x^2 - 0.2438x + 0.3763 \qquad \text{Formula (II)}$$

where y is the thermal conductivity (k-value) expressed as BTU-in/(hr·ft$^{2\cdot\circ}$ F.), and x is the product density, expressed in lb/ft$^3$ or pcf. Formula (II) has a R$^2$=0.9803, indicating a high degree of accuracy in the equation.

Accordingly, at a given density, the inventive 3.6 micron insulation product demonstrated a significantly lower thermal conductivity than expected, based on an insulation product having an even smaller fiber average fiber diameter (3.0 microns vs. 3.6 microns). For example, at a density of 0.8 pcf, Formula (I) outputs a thermal conductivity prediction of 0.2660 BTU-in/(hr·ft$^{2\cdot\circ}$ F.), while the inventive 3.6 micron fiberglass insulation product demonstrated a lower measured thermal conductivity (k-value) of 0.2461 BTU-in/(hr·ft$^{2\cdot\circ}$ F.). A k-value reduction of 0.0199 is a statistically significant reduction.

In some embodiments, the fibrous insulation product of the subject disclosure demonstrates a reduction in k-value of at least 0.01 BTU-in/(hr·ft$^{2\cdot\circ}$ F.) compared to the Expected Results over a density range of 0.2 pcf to 1.35 pcf, including a reduction in k-value of at least 0.015, at least 0.03, at least 0.05, at least 0.075, at least 0.1, at least 0.15, at least 0.2, and at least 0.23 BTU-in/(hr·ft$^{2\cdot\circ}$ F.).

In any of the exemplary embodiments provided herein, the fibrous insulation product may have a thermal conductivity (k-value (y)) expressed as BTU-in/(hr·ft$^{2\circ}$ F.) equal to or less than that which satisfies Formula (III):

$$y = 0.116x^2 - 0.3002x + 0.4219 \qquad \text{Formula (III)}$$

where x is the product density within the range of 0.2 pcf and 1.6 pcf. Formula (III) is based on Formula (I), but reduced by 0.01 to ensure sufficient separation over expected results. In these or other exemplary embodiments, the fibrous insulation product may have a thermal conductivity (k-value (y)

expressed as BTU·in/(hr·ft$^{2\circ}$ F.) within 10%, or at least within 5%, of a value (y) that satisfies Formula (IV):

$$y=0.1013x^2-0.2438x+0.3763 \hspace{2cm} \text{Formula (IV)}$$

where x is the product density within the range of 0.2 pcf and 1.6 pcf.

Although particular benefits may be exemplified in low density insulation products (i.e., less than 1.6 pcf), the density of the fibrous insulation product may vary in different embodiments. As used in this application, the density of the fibrous insulation product is the density of the product after the binder composition has been cured and the cured product is in a free state (i.e., not compressed or stretched). In various embodiments, the density of the fibrous insulation product is in the range of 0.2 pcf to 2.7 pcf. Table 3 lists the original density, in pcf, for various exemplary embodiments of fibrous insulation products having fine fibers in the range of 2.03 µm (8.0 HT) to 3.81 µm (15 HT). In Table 3, the fiber diameters refer to an average fiber diameter, prior to the application of the binder composition, as measured by the air flow resistance method described above. The thickness and original density refer to the thickness and density of the product after the binder composition has been cured and the cured product being in a free state (i.e., not compressed or stretched).

TABLE 3

| Thickness | 3.50 | 3.50 | 3.50 | 6.25 | 5.50 | 5.50 | 9.50 | 12.00 | 14.00 |
|---|---|---|---|---|---|---|---|---|---|
| Binder Content (% wt.) | 5.50 | 5.50 | 4.00 | 5.50 | 5.50 | 4.00 | 5.50 | 5.50 | 4.00 |
| R-Value | R11 | R13 | R15 | R19 | R20 | R21 | R30 | R38 | R49 |
| Fiber Diameter | | | | | Product Density | | | | |
| 8 | 0.353 | 0.549 | 0.950 | 0.326 | 0.513 | 0.589 | 0.355 | 0.357 | 0.453 |
| 9 | 0.363 | 0.569 | 0.987 | 0.336 | 0.530 | 0.611 | 0.366 | 0.369 | 0.468 |
| 10 | 0.377 | 0.590 | 1.025 | 0.348 | 0.550 | 0.631 | 0.379 | 0.381 | 0.483 |
| 11 | 0.387 | 0.607 | 1.063 | 0.359 | 0.567 | 0.652 | 0.392 | 0.394 | 0.500 |
| 12 | 0.401 | 0.627 | 1.097 | 0.371 | 0.585 | 0.674 | 0.403 | 0.406 | 0.515 |
| 13 | 0.411 | 0.645 | 1.135 | 0.382 | 0.602 | 0.694 | 0.416 | 0.418 | 0.531 |
| 14 | 0.425 | 0.665 | 1.173 | 0.392 | 0.622 | 0.716 | 0.428 | 0.430 | 0.547 |
| 15 | 0.435 | 0.686 | 1.214 | 0.403 | 0.639 | 0.737 | 0.440 | 0.443 | 0.563 |

The data in Table 3 shows fibrous insulation products having R-values from 11 to 49 produced with average fiber diameters less than or equal to 15 HT, original densities in the range of 0.371 pcf to 1.214 pcf, and less than or equal to 6% by weight of the binder composition.

Material Efficiency

As mentioned above, material efficiency is a measurement of a product's insulation value (R·ft$^2$) per pound of insulation material and is expressed as R·ft$^2$/lb. By maximizing material efficiency, an insulation product can offer high insulation performance at as low of a weight as possible. Stated another way, because of its improved material efficiency, the inventive insulation products can achieve equivalent insulation performance at a lower weight/density. Lowering product weight allows for a reduction in the amount of fiberglass and binder material needed and thus reduces overall cost (e.g., production, storage, shipping, and/or disposal costs). Additionally, lower density products are lighter and easier to handle that higher density products for the same square footage of product a bag.

It has unexpectedly been discovered that the fibrous insulation products of the present disclosure demonstrate a surprising increase in material efficiency compared to what would be expected, based on the Expected Results. At a higher material efficiency, the inventive fibrous insulation product can provide a desired insulation performance, (R-value) at a lower than predicted area weight.

Figure 15:
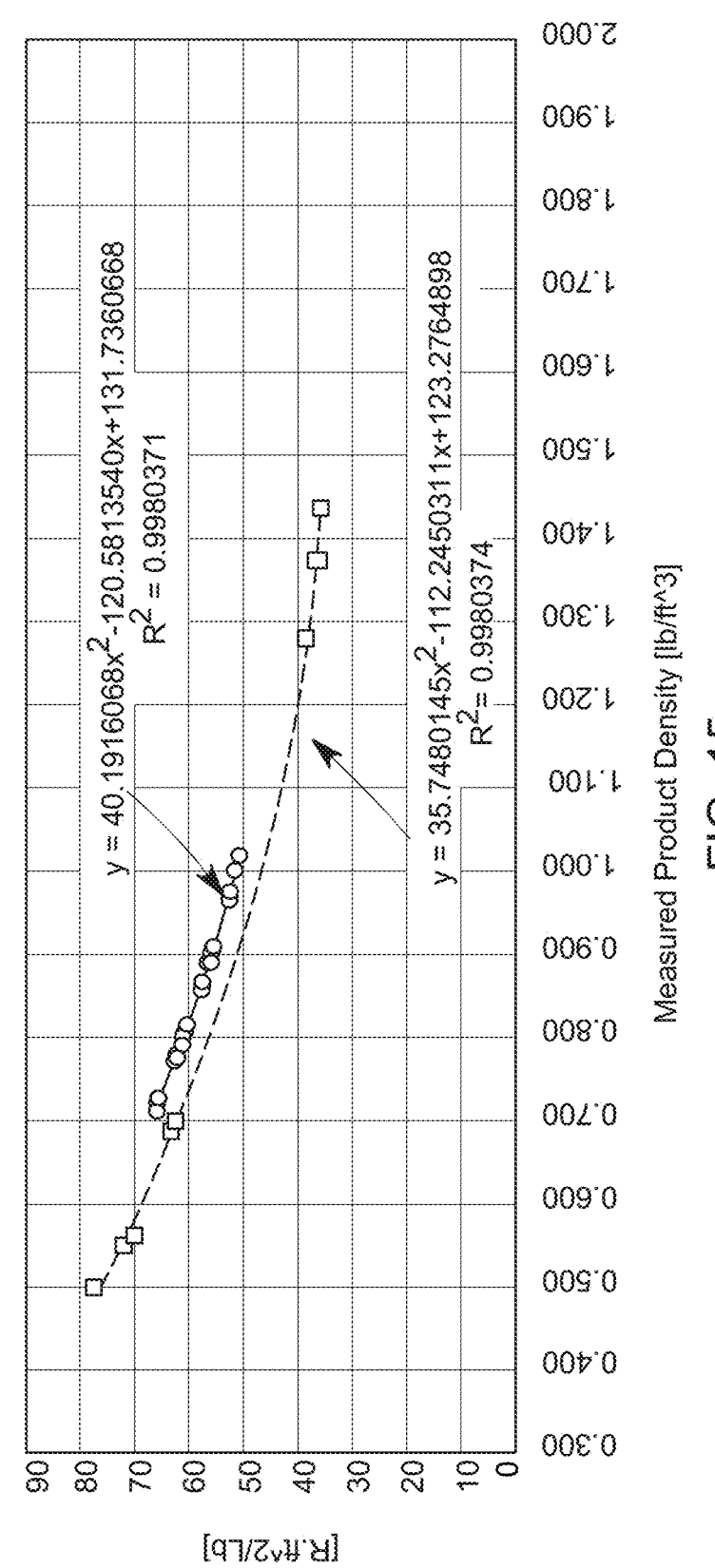
FIG. 15 graphically illustrates a predicted material efficiency curve per product density compared to an actual material efficiency curve per product density.

FIG. 15 illustrates the material efficiency difference between the output of the Expected Results, based on a fiberglass insulation product with an average fiber diameter of 3 microns and a thickness of 5.5 inches, and the actual material efficiency of the inventive 3.6 micron insulation product at a thickness of 5.5 inches. As illustrated in FIG. 15, the predicted material efficiency of a fibrous insulation product determined by the Expected Results corresponds to Formula (V), below:

$$y=35.7480145x^2-112.2450311x+123.2764898 \hspace{1cm} \text{Formula (V)}$$

where y is material efficiency, expressed as R·ft$^2$/lb, and x is the product density over a density range of about 0.5 pcf to about 1.5 pcf. Formula (V) has a R$^2$=0.9980374, indicating a high degree of accuracy in the model. In contrast, the actual material efficiency of the inventive 3.6 micron insulation product corresponds to Formula (VI):

$$y=40.1916068x^2-120.5813540x+131.7360668 \hspace{1cm} \text{Formula (VI)}$$

where y is the material efficiency, expressed as R·ft$^2$/lb, and x is the product density, over a density range of about 0.7 pcf to about 1.35 pcf. Formula (V) has a R$^2$=0.9980374, indicating a high degree of accuracy in the equation.

At a given density, the inventive 3.6 micron insulation product demonstrates a higher material efficiency than predicted, based on an insulation product having an even smaller fiber average fiber diameter (3.0 microns versus 3.6 microns). For example, at a density of 0.8 pcf, Formula (V) predicts a material efficiency of 56.36 R·ft$^2$/lb, while the inventive 3.6 micron fiberglass insulation product demonstrates an actual material efficiency of 60.99 R·ft$^2$/lb, an increase of over 4 units. Similarly, at a density of 0.6 pcf, Formula (V) predicts a material efficiency of 68.80 R·ft$^2$/lb, while the inventive 3.6 micron fiberglass insulation product demonstrates an actual material efficiency of 73.86 R·ft$^2$/lb an increase of over 5 units.

Thus, the fibrous insulation product of the subject disclosure demonstrates an increased material efficiency of at least 4.0 units compared to that expected, over a density range of 0.2 pcf to 1.6 pcf, and at some instances at least 5.0 units, at least 5.5 units, at least 5.8 units, and at least 6.0 units.

In any of the exemplary embodiments provided herein, the fibrous insulation product, at an R-value between 19 and 24, an area weight between 0.3 lb/ft$^2$ and 0.5 lb/ft$^2$, and density between 0.7 pcf and 1.35 pcf, may have a material efficiency in accordance with the formula ME=R-value/area weight (W) of at least 50, such as at least 55, at least 58, at least 60, at least 63, at least 65, at least 68, at least 70, at least 75, and at least 80.

As an individual insulation product may include a certain degree of variation within the product itself, it is to be appreciated that the thermal performance values provided above are average predicted values that do not consider this natural variation. Thus, to account for natural product variation, Formula (VI) above may be adjusted by the variation value, which has been calculated as 2.1076693 at 95% confidence level. Thus, taking into consideration this variation value, the adjusted material efficiency of the inventive insulation product corresponds to Formula (VII):

$$y=40.1916068x^2-120.5813540x+129.628397 \qquad \text{Formula (VII)}$$

where y is adjusted material efficiency, expressed as R·ft²/lb, and x is the product density over a density range of about 0.5 pcf to about 1.5 pcf.

Figure 16:
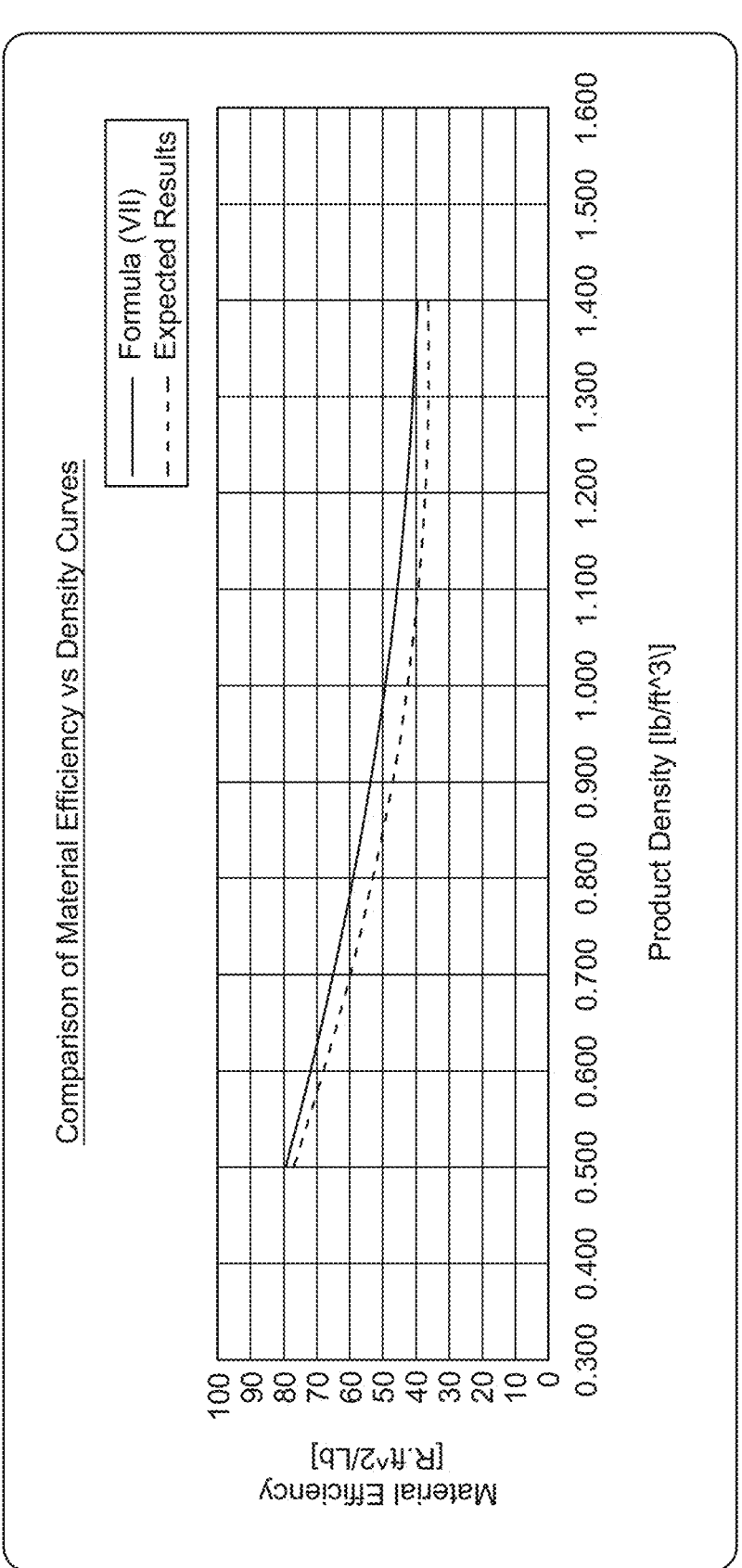
FIG. 16 graphically illustrates a predicted material efficiency curve per product density compared to an adjusted material efficiency curve per product density.

FIG. 16 graphically illustrates the material efficiency difference between the output of the Expected Results, based on a fiberglass insulation product with an average fiber diameter of 3 microns and a thickness of 5.5 inches, and the adjusted material efficiency of the inventive 3.6 micron insulation product at a thickness of 5.5 inches and including the variation variable.

As illustrated in FIG. 16, the adjusted material efficiency of the inventive 3.6 micron insulation product demonstrates a higher material efficiency than the Expected Results, based on an insulation product having an even smaller fiber average fiber diameter (3.0 microns versus 3.6 microns). For instance, at a density of 0.8 pcf, Formula (V) (the Expected Results) predicts a material efficiency of 56.36 R·ft²/lb, while the inventive 3.6 micron fiberglass insulation product demonstrates an adjusted material efficiency of 58.89 R·ft²/lb, an increase of over 2 units. Similarly, at a density of 0.6 pcf, Formula (V) predicts a material efficiency of 68.80 R·ft²/lb, while the inventive 3.6 micron fiberglass insulation product demonstrates an adjusted material efficiency of 71.75 R·ft²/lb an increase of almost 3 units.

Although particular benefits may be exemplified in products having a variety of area weights, particular benefits may be captured at relatively low area weights, while maintaining desirable thermal properties. As used in this application, the area weight of the fibrous insulation product is the weight of the insulation product after the binder composition has been cured per square foot (lb/ft²). In various embodiments, the area weight of the fibrous insulation product is in the range of 0.1 lb/ft² to 2.0 lb/ft², including between 0.2 lb/ft² and 1.8 lb/ft², between 0.25 lb/ft² and 1.5 lb/ft², between 0.3 lb/ft² and 1.2 lb/ft², between 0.35 lb/ft² and 1.0 lb/ft², and between 0.38 lb/ft² and 0.6 lb/ft². In any of the exemplary embodiments, the area weight of the fibrous insulation product may be less than 0.55 lb/ft² including less than 0.5 lb/ft², less than 0.48 lb/ft², less than 0.45 lb/ft², and less than 0.42 lb/ft².

Additionally, as mentioned above, the improved thermal and material efficiency benefits may be captured at any insulation product thicknesses, and particular benefits may be seen at relatively low product thicknesses. Generally, the R-value of an insulation product can be improved by increasing the thickness ($T_1$) of the insulation product, which in turn may lower the product's density (assuming no other changes to the product). However, increasing product thicknesses is not possible for constrained products (i.e., those installed into a fixed thickness wall cavity). Accordingly, there is no R-value advantage obtained by making a product thicker than the thickness of the wall cavity, as the insulation product can only expand to the thickness of the wall opening. In any of the exemplary embodiments, the fibrous insulation product thickness $T_1$ may be less than about 20 inches, including a thickness no greater than 18 inches, no greater than 15 inches, no greater than 12 inches, no greater than 10 inches, no greater than 8 inches, no greater than 7 inches, no greater than 6.5 inches, and no greater than 6 inches. For example, in some thickness-constrained products, the fibrous insulation product may have a thickness that is less than 7 inches, including less than 6.5 inches, less than 6 inches, less than 5.5 inches, less than 5 inches, less than 4.5 inches, and less than 4 inches. In these or other embodiments, the fibrous insulation product may have a thickness of, for example, 0.5 inches to 8 inches, including thicknesses between 0.75 inches and 7.5 inches, between 0.9 inches and 7.0 inches, between 1.0 inch and 6.8 inches, between 1.5 inches and 6.3 inches, and between 2.0 inches and 6.0 inches.

Table 4 illustrates the structural and thermal properties for two exemplary fibrous insulation products (Examples 1 and 2) formed with fibers having an average fiber diameter of 14.5 and 14.4 HT, respectively. Each of the products of Example 1 and 2 was formed with a formaldehyde-free binder composition comprising a monomeric polyol and polymeric polycarboxylic acid crosslinking agent. Examples 1 and 2 had thicknesses of 5.5 inches and insulation values of R-22. As shown in Table 4, below, at k-values of 0.25 BTU·in/hr·ft2·° F., Examples 1 and 2 demonstrated low densities of 0.746 lb/ft³ and 0.759 lb/ft³, respectively, with LOI values below 4%. In contrast, Comparative Example 1 was formed with 15.9 HT glass fibers and a binder composition comprising a polymeric polyol and monomeric polycarboxylic acid cross-linking agent. The product of Comparative Example 1, at a thickness of 5.5 inches and k-value of 0.25 BTU·in/hr·ft2·° F. demonstrated a density of 0.830 lb/ft³, which is at least 7%, and particularly at least 9% higher than the densities of Example 1 and 2.

Further surprisingly, Comparative Example 2 was formed with 14.3 HT glass fibers (thereby considered "fine fiber" as defined herein) and a binder composition comprising a polymeric polyol and monomeric polycarboxylic acid cross-linking agent. The product of Comparative Example 2, at a thickness of 5.5 inches and k-value of 0.23 BTU·in/hr·ft2·° F. demonstrated a density of 1.25 lb/ft³, at least 39% higher than the densities of Example 1 and 2.

TABLE 4

| | $T_1$ (in) | k-Value (BTU-in/ hr · ft² · ° F.) | R-Value (hr · ft² · ° F./ BTU) | Area wt. (lb/ ft²) | Density (lb/ft³) | Density Δ from Comp. Ex. 1 | Density Δ from Comp. Ex. 2 | LOI (%) | Average Fiber Diameter (HT) | Material Eff. (R · ft²/ lb) |
|---|---|---|---|---|---|---|---|---|---|---|
| Comp. EX. 1 (ET) R-22 | 5.5 | 0.25 | 22.0 | 0.380 | 0.830 | 0% | 33.6% | 4.28 | 15.9 | 57.89 |
| Comp. Ex. 2 (ET) R-24 | 5.5 | 0.23 | 23.8 | 0.531 | 1.25 | 33.6% | 0% | 6.58 | 14.3 | 44.8 |
| Example 1 R-22 | 5.5 | 0.25 | 22.0 | 0.342 | 0.746 | 10% | 40.3% | 3.75 | 14.5 | 64.33 |

TABLE 4-continued

|  | $T_1$ (in) | k-Value (BTU-in/ hr · ft² · ° F.) | R-Value (hr · ft² · ° F./ BTU) | Area wt. (lb/ ft²) | Density (lb/ft³) | Density Δ from Comp. Ex. 1 | Density Δ from Comp. Ex. 2 | LOI (%) | Average Fiber Diameter (HT) | Material Eff. (R · ft²/ lb) |
|---|---|---|---|---|---|---|---|---|---|---|
| Example 2 R-22 | 5.5 | 0.25 | 22.0 | 0.348 | 0.759 | 9% | 39.3% | 3.79 | 14.4 | 63.21 |

Moreover, at the same thickness and roughly the same R-values, Examples 1 and 2 increased material efficiency by over 5 units, compared to the products of Comparative Examples 1 and 2. These differences can be attributed at least to the increase in area weight required in Comparative Examples 1 and 2 to achieve a k-value comparable to that of Examples 1 and 2. Accordingly, it can be seen that the fibrous insulation products of the present disclosure are capable of providing improved thermal properties at a reduced area weight, thereby improving the efficiency of the product as a whole.

The fiberglass insulation materials of the present invention may have any combination or sub-combination of the properties disclosed and the ranges for those properties disclosed herein. While the present invention has been illustrated by the description of embodiments thereof, it is not the intention of the applicant to restrict or in any way limit the scope of the appended claims to such detail. Additional advantages and modifications will readily appear to those skilled in the art. While the fibrous insulation product has been illustrated herein as a flexible batt or blanket, other configurations and geometries can be used. Further, the fibrous insulation product may be used in a variety of ways and is not limited to any specific application. Therefore, the invention, in its broader aspects, is not limited to the specific details, the representative apparatus, and illustrative examples shown and described. Accordingly, departures can be made from such details without departing from the spirit or scope of the general inventive concepts.

The invention claimed is:

1. An insulation product comprising:
a plurality of glass fibers; and
a cross-linked formaldehyde-free binder composition at least partially coating the glass fibers,
wherein the glass fibers have an average fiber diameter within a range 8 HT (2.03 μm) to 15 HT (3.81 μm);
wherein the insulation product has a binder content (LOI) of less than or equal to 8% by weight;
wherein the insulation product has a density (x) between 0.2 pcf and 1.6 pcf;
wherein the insulation product achieves a thermal conductivity (k-value), expressed as BTU-in/(hr·ft²·° F.), less than or equal to a value (y) which satisfies Formula (III):

$$y=0.116x^2-0.3002x+0.4219 \qquad \text{Formula (III).}$$

2. The insulation product of claim 1, wherein the thermal conductivity (k-value) is less than 0.3 BTU-in/(hr·ft²·° F.).

3. The insulation product of claim 1, wherein the density (x) is between 0.2 pcf and 1.35 pcf, and the thermal conductivity (k-value), expressed as BTU-in/(hr·ft²·° F.), is within 5% of a value (y) that satisfies Formula (II):

$$y=0.1013x^2-0.2438x+0.3763 \qquad \text{Formula (II).}$$

4. The insulation product of claim 1, wherein the insulation product has a density (x) between 0.7 pcf and 1.0 pcf.

5. The insulation product of claim 1, wherein the insulation product comprises a length, a width, and a thickness, with the length being greater than each of the width and the thickness, and wherein at least 30% by weight of the glass fibers are oriented within +/−15° of a plane parallel to the length and width of the insulation product.

6. The insulation product of claim 1, wherein at least 40% by weight of the glass fibers are oriented within +/−15° of a plane parallel to the length of the insulation product.

7. The insulation product of claim 1, wherein the average fiber diameter of the glass fibers is in the range of 12 HT (3.05 μm) to 14.5 HT (3.68 μm).

8. The insulation product of claim 1, wherein prior to crosslinking, the formaldehyde-free binder composition comprises at least one monomeric polyol and polycarboxylic acid in a combined amount of at least 45% by weight, based on a total weight of the binder composition.

9. A method of forming an insulation product, the method comprising:
fiberizing molten glass into a plurality of glass fibers;
coating the glass fibers with an aqueous, formaldehyde-free binder composition;
randomly depositing the glass fibers onto a moving conveyor, forming an uncured fiberglass blanket; and
passing the uncured fiberglass blanket through a curing oven to cross-link the binder composition and form the fibrous insulation product,
wherein the glass fibers have an average fiber diameter in a range of 8 HT (2.03 μm) to 15 HT (3.81 μm);
wherein the insulation product has a binder content (LOI) of less than or equal to 8% by weight;
wherein the insulation product has a density (x) between 0.2 pcf and 1.6 pcf;
wherein the insulation product achieves a thermal conductivity (k-value), expressed as BTU-in/(hr·ft²·° F.), less than a value (y) which satisfies Formula (III):

$$y=0.116x^2-0.3002x+0.4219 \qquad \text{Formula (III).}$$

10. The method of claim 9, wherein the thermal conductivity (k-value) is less or equal to than 0.35 BTU-in/(hr·ft²·° F.).

11. The method according to claim 9, wherein the density (x) is between 0.5 pcf and 1.35 pcf, and the insulation product achieves a thermal conductivity (k-value), expressed as BTU-in/(hr·ft²·° F.), within 5% of a value (y) that satisfies Formula (II):

$$y=0.1013x^2-0.2438x+0.3763 \qquad \text{Formula (II).}$$

12. The method according to claim 9, wherein the insulation product has a density (x) between 0.7 pcf and 1.0 pcf.

13. The method according to claim 9, wherein the insulation product comprises a length, a width, and a thickness, with the length being greater than each of the width and the thickness, and wherein at least 30% by weight of the glass fibers are oriented within +/−15° of a plane parallel to the length and width of the insulation product.

14. The method according to claim 9, wherein the average fiber diameter of the glass fibers is in the range of 12 HT (3.05 μm) to 14.5 HT (3.68 μm).

15. The method according to claim 9, wherein prior to crosslinking, the formaldehyde-free binder composition comprises at least one monomeric polyol and polycarboxylic acid in a combined amount of at least 45 wt. %, based on a total weight of the binder composition.

* * * * *